United States Patent [19]

Baert

[11] 4,125,326
[45] Nov. 14, 1978

[54] PAPER FEED CUT OFF FOR PHOTOGRAPHIC PRINTER

[75] Inventor: Victor R. Baert, Anoka, Minn.

[73] Assignee: Pako Corporation, Minneapolis, Minn.

[21] Appl. No.: 776,930

[22] Filed: Mar. 11, 1977

[51] Int. Cl.² .................. G03B 27/58; B65H 25/32
[52] U.S. Cl. .................................... 355/74; 226/43
[58] Field of Search .................. 355/14, 72, 50, 51, 355/8, 65, 66, 64, 73, 74; 271/258, 259; 226/25, 37, 43

[56] References Cited

U.S. PATENT DOCUMENTS 3,045,540 7/1962 Caps et al. ............................. 355/65
3,928,772 12/1975 Mooney ................................ 307/116

Primary Examiner—L. T. Nix
Assistant Examiner—W. J. Brady
Attorney, Agent, or Firm—Kinney, Lange, Westman and Fairbairn

[57] ABSTRACT

A photographic printer has a paper feed system for automatically advancing print paper by a predetermined feed length after each exposure. A paper feed cut off circuit terminates the paper feed after a predetermined time period in the event that the paper feed has not been previously terminated. This prevents waste of large amounts of print paper in the event of a malfunction in the automatic paper feed system.

9 Claims, 33 Drawing Figures

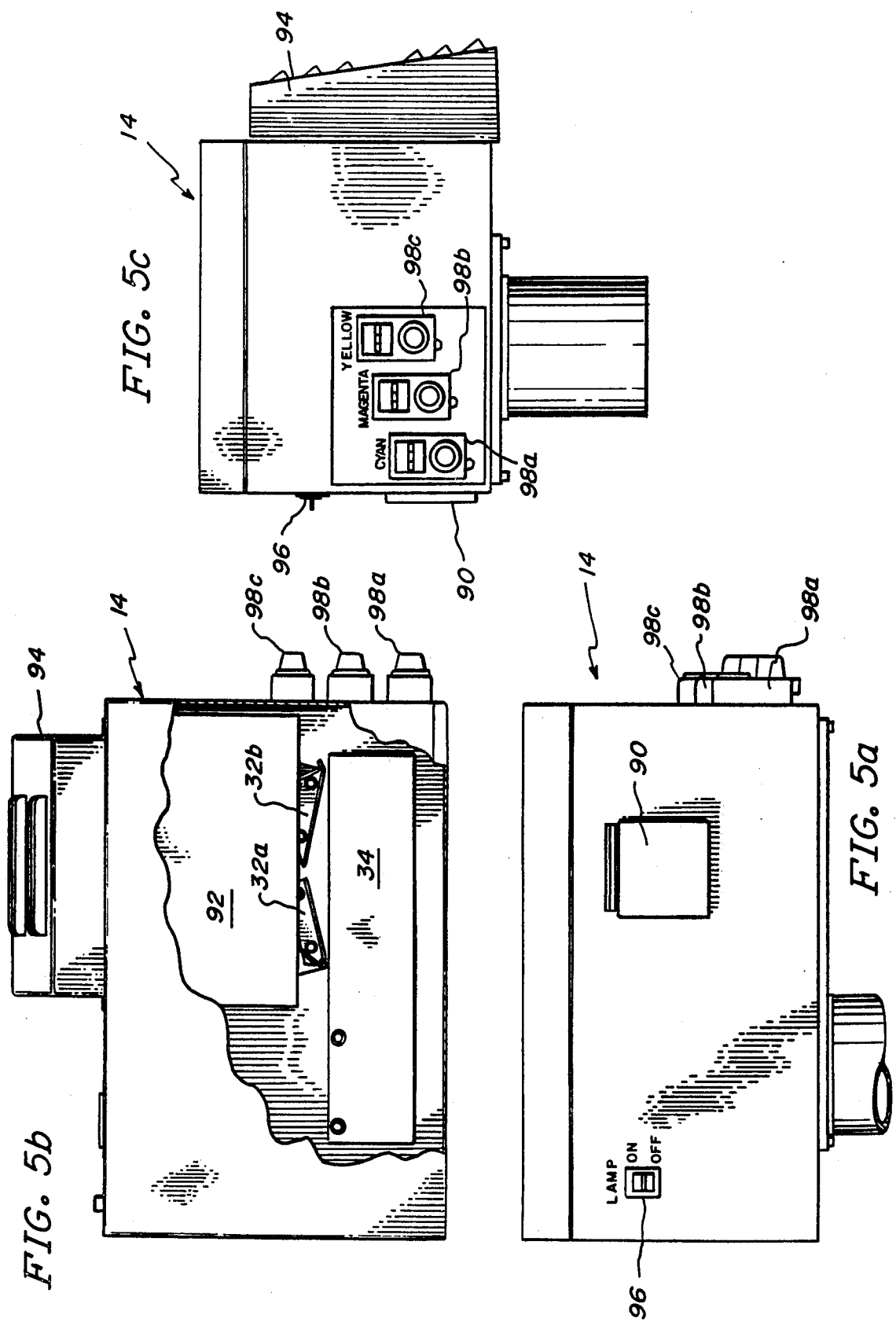

FIG. 12a
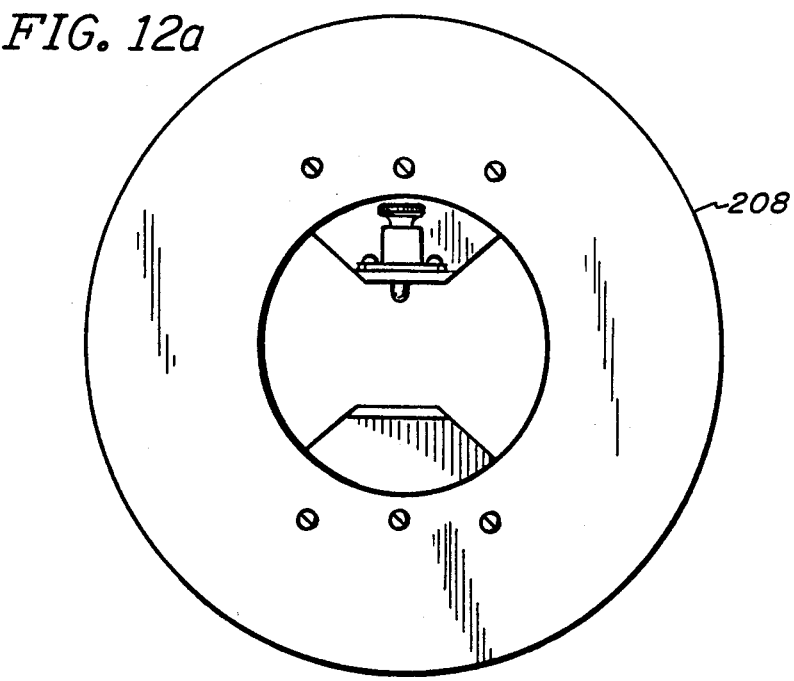
FIG. 12b
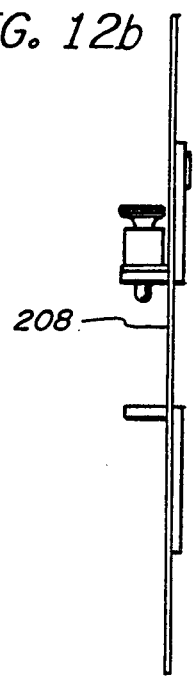
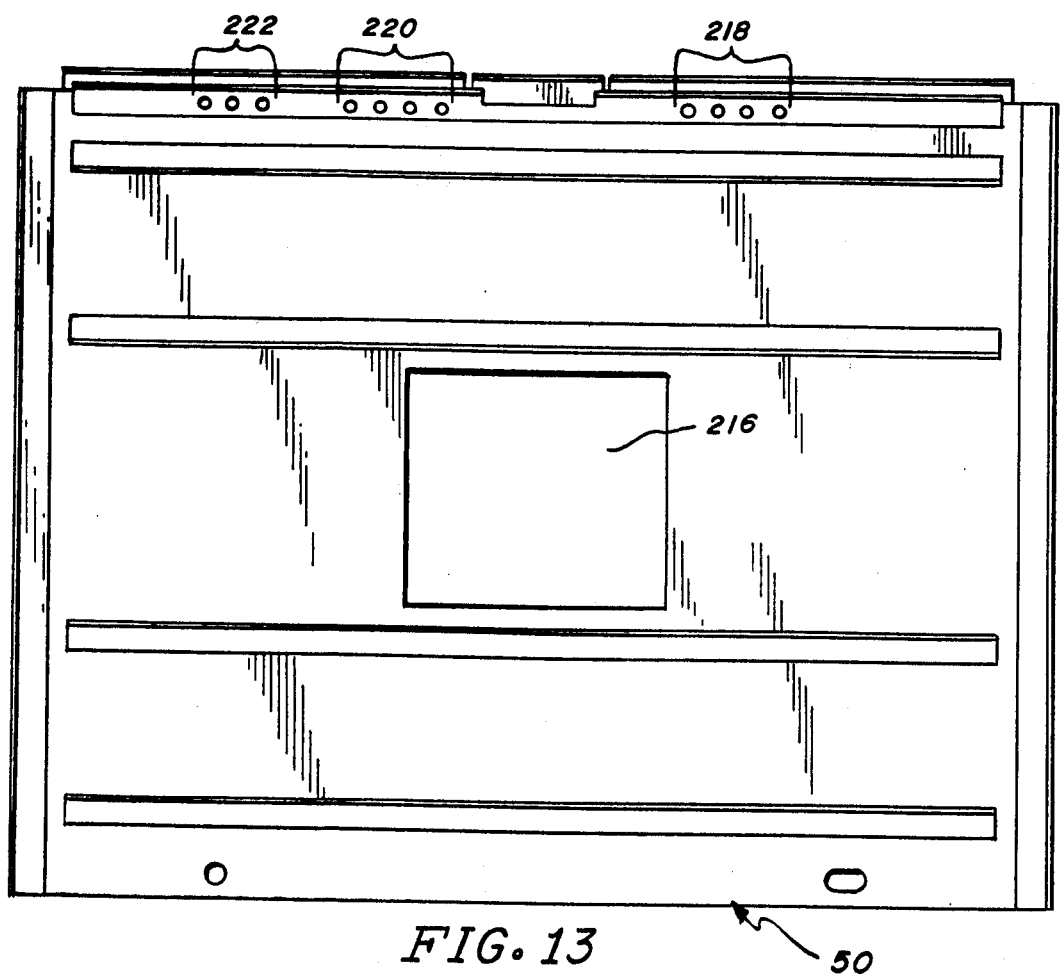
FIG. 13

PAPER FEED CUT OFF FOR PHOTOGRAPHIC PRINTER

REFERENCE TO CO-PENDING APPLICATIONS

Reference is made to co-pending applications entitled "Paper Feed System for Photographic Printer Ser. No. 776,876", "Test System for Photographic Printer Ser. No. 776,873", "Light Source for Photographic Printer Ser. No. 776,875", and "Photographic Printer Ser. No. 776,877", in which subject matter disclosed but not claimed in this application is disclosed and claimed. These co-pending applications are assigned to the same assignee as the present application.

BACKGROUND OF THE INVENTION

The present invention is concerned with photographic printing systems. In particular, the present invention relates to an improvement which overcomes problems encountered with automatic paper feed systems in photographic printing systems.

Photographic printers produce color or black and white prints from negatives. High intensity light is passed through a negative and imaged on photographic print paper. A photographic emulsion layer on the print paper is exposed and subsequently processed to produce a print of the scene contained in the negative.

Photographic processing centers typically process film from many customers. The printers used in these processing centers must be capable of producing color and black and white prints from a range of negative sizes which include, for example, 110, 120, 126, 35 mm, 70mm and $2\frac{1}{4} \times 3\frac{1}{4}''$ negative sizes. The desired prints may have ten or more different sizes and may be either with or without a border. In addition, some of the orders call for multiple prints from a single negative.

In order to increase efficiency and minimize the time required to fulfill customer orders, high speed printers in which many exposures are made on a single roll of print paper are desirable. After the many exposures are made, the portion of the roll which has been exposed is removed from the printer, is photo processed to produce prints, and is cut to individual prints. The prints are then sorted by customer order and ultimately packaged and sent to the customer.

One sub-system of a photographic printer which helps increase efficiency is an automatic paper feed system. This automatically advances the print paper by a predetermined feed length after each exposure. The predetermined feed length is determined by the size of the prints then being made and the format of the prints (for example, with or without a border).

SUMMARY OF THE INVENTION

The present invention overcomes a problem which has been encountered with photographic printers having automatic paper feed systems. It has been discovered that as a result of mechanical or electrical malfunction in the paper feed system, the paper feed system will continue to advance the print paper far beyond the predetermined feed length. In extreme cases, an entire roll of print paper may be advanced by the automatic paper feed system. As a result, large amounts of print paper may be wasted, prints may be ruined, and valuable time lost. In addition, in prior systems when the printer runs out of paper during a paper feed operation, the paper feed system continues to run until the operator finally discovers the problem. This can result in loss of valuable time.

In the present invention, paper feed cut off means are provided which overcome the shortcomings of the prior art automatic paper feed systems. The paper feed cut off means terminates paper feed after a predetermined period if the paper feed has not been previously terminated. By properly selecting the predetermined period, loss of paper, prints, and time, in the event of malfunction of the automatic paper feed system or in the event of running out of paper, are kept to a minimum.

BRIEF DESCRIPTION OF THE DRAWINGS

FIGS. 5a–5c show the lamphouse.

FIGS. 12a and 12b show the core guide assembly.

FIG. 13 shows a typical paper mask.

DETAILED DESCRIPTION OF THE PREFERRED EMBODIMENTS

System Overview

The photographic printer of the present invention produces color or black and white prints from a range of negative sizes, including various formats of 110, 120, 126, 35 mm, 70mm and $2\frac{1}{4} \times 2\frac{3}{4}$ inch negatives. The prints are made on a roll of photographic print paper up to 250 feet long in $3\frac{1}{2}$, 5, 8, and 9.4 inch widths.

Figure 1:
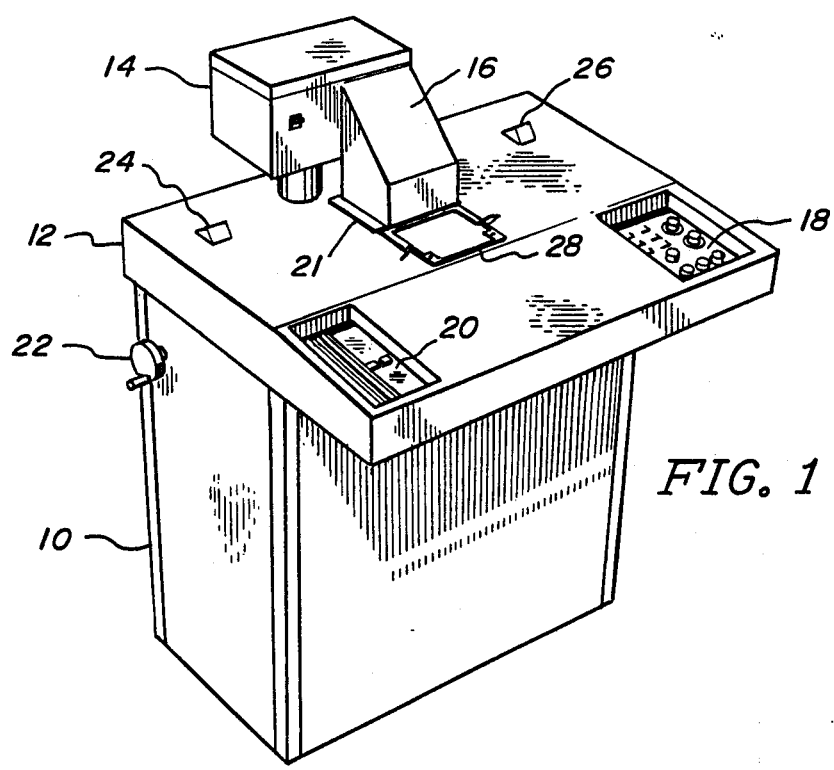
FIG. 1 shows the photographic printer of the present invention.

FIG. 1 shows the printer of the present invention. The printer includes a cabinet 10, which houses most of the printer mechanism, a console 12 on top of cabinet 10, and a lamphouse 14 and a color mixing chamber 16 mounted on console 12.

Console 12 has two recessed panels, operator panel 18 and control panel 20, which contain various switches and dials. These switches and dials provide the operator with options such as manual or automatic exposure control, manual or automatic paper feed, multiple or single prints per negative, and printer-governed or operator-governed exposure times.

Lamphouse 14 contains two print lamps which provide high intensity light. Three pair of dichroic filters in lamphouse 14 modify the color bands of the light to provide near synchronized exposure times. The light is mixed in mixing chamber 16 and directed downward to provide essentially uniform light distribution at the negative, which is held in a negative mask or carrier (not shown) in neghold 21 beneath mixing chamber 16.

The light passes through the negative and is focused by a lens onto the print paper. A paper mask defines the size and format of the print on the print paper. A photocell sensor ring and associated electronic logic gauge the light passed through the negative and determine when the exposure of each paper emulsion layer is to be terminated. Filter paddles below the lens are driven into the light path to terminate the exposure of each color.

Lensdeck adjustment handwheel 22 on the left side of cabinet 10 allows adjustment up and down of the lens and lensdeck by means of lensdeck counter 24 on the left side of console 12. Lensdeck counter 24 is a four-digit counter driven by the lensdeck pulley. The count on lensdeck counter 24 is used for reference in setting the position of the lensdeck.

On the right side of cabinet 10 is a paperdeck adjustment handwheel (not shown) which adjusts the paperdeck up and down. Paperdeck counter 26, a four-digit counter on the right side of console 12, is for reference in setting the paperdeck position. By positioning the lensdeck and paperdeck, proper focus and magnification for a variety of negative and print sizes is achieved.

A preview area 28 is also provided on console 12. The negative and negative carrier are placed over preview area 28, where the negative may be viewed. A preview lamp beneath preview area 28 provides light to allow the operator to frame the negative properly in the negative mask. Printing is commenced by moving the negative and negative carrier from preview area 28 to the print position under mixing chamber 16.

An important advantage of the printer of the present invention is that all operations, except paper loading-/unloading and changing paper masks, may be accomplished under normal room light rather than darkroom conditions. Lensdeck, paperdeck, color density, dichroic filter, paper feed, and print counter controls are readily accessible without opening cabinet 10. Digital indicators for each control (such as lensdeck counter 24 and paperdeck counter 26) provide ease of repeatability when setting up the printer.

Optical System

Figure 2:
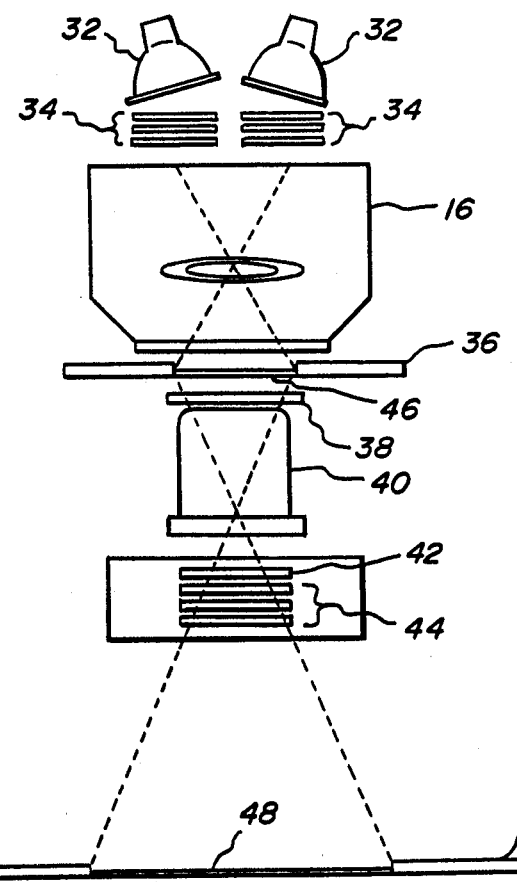
FIG. 2 schematically shows the optical system of the printer.

FIG. 2 is a schematic diagram of the optical system of the printer. The optical system includes a pair of printlamps 32, three pairs of dichroic filters 34, mixing chamber 16, negative masks 36, photocell sensor ring 38, lens 40, shutter paddle 42 and filter paddles 44.

Printlamps 32 operate at low intensity prior to commencement of a print cycle. When the print cycle begins, they increase to high intensity until the exposure is completed.

The three pairs of dichroic filters 34 in the lamphouse are cyan (farthest from printlamps 32), magenta (center), and yellow (nearest printlamps 32). Each pair of filters can be moved into or out of the light path by controls on the lamphouse to modify the colors of the light. For black and white printing, the filters are either moved out of the light path entirely or only the magenta filters are placed in the light path. The magenta filters improve contrast of black and white prints.

Light from the lamphouse enters mixing chamber 16. "Hot spots" in the light beam are diffused by a circular diffuser in chamber 16. In addition, a diffusion plate at the bottom of chamber 16 distributes the light evenly across negative 46.

Negative mask 36 is one of a set of masks of various sizes adapted to hold negative 46. The size and format of negative 46 dictate the particular negative mask used.

Photocell sensor ring 38 is positioned below negative 46 to receive scattered light from negative 46. Most of the light passes unimpeded through ring 38 to lens 40. During normal, automatic operation, photocell sensor ring 38 operates to alter the exposure time called for by the color controls, according to the actual colors in negative 46.

Lens 40, shutter paddle 42, filter paddles 44, a bellows (not shown), and other associated hardware form the lensdeck of the printer. The lensdeck position may be moved up and down to achieve proper focus by using the lensdeck adjustment handwheel 22 (shown in FIG. 1).

Lens 40 is one of several interchangeable lenses which may be used to focus the image from the negative onto print paper 48. The particular lens selected is determined by negative size and the print size.

Shutter paddle 42 is normally in position in the light path below lens 40. At the beginning of an exposure, shutter paddle 42 is moved out of the light path. The exposure is discontinued by shutter paddle 42 when the longest running color has finished its exposure time.

Filter paddles 44, which normally rest out of the light path, limit the exposure in specific color channels. When the exposure in the red, green, or blue channel is completed, the cyan, magenta, or yellow filter paddle is driven into the light path. During black and white printing, filter paddles 44 remain out of the light path and do not function.

The paperdeck includes a paper drive mechanism (not shown) for advancing and taking up print paper 48 as successive prints are made. Paper mask 50 defines the size and format of the prints. The paperdeck may be adjusted up and down to achieve proper focus and magnification of the image from negative 46.

Printer Controls

The printer of FIG. 1 includes a variety of controls with which the operator can modify and control the operation of the printer. Operator panel 18, control panel 20, and lamphouse 14 each have external controls for operator use.

Figure 3:
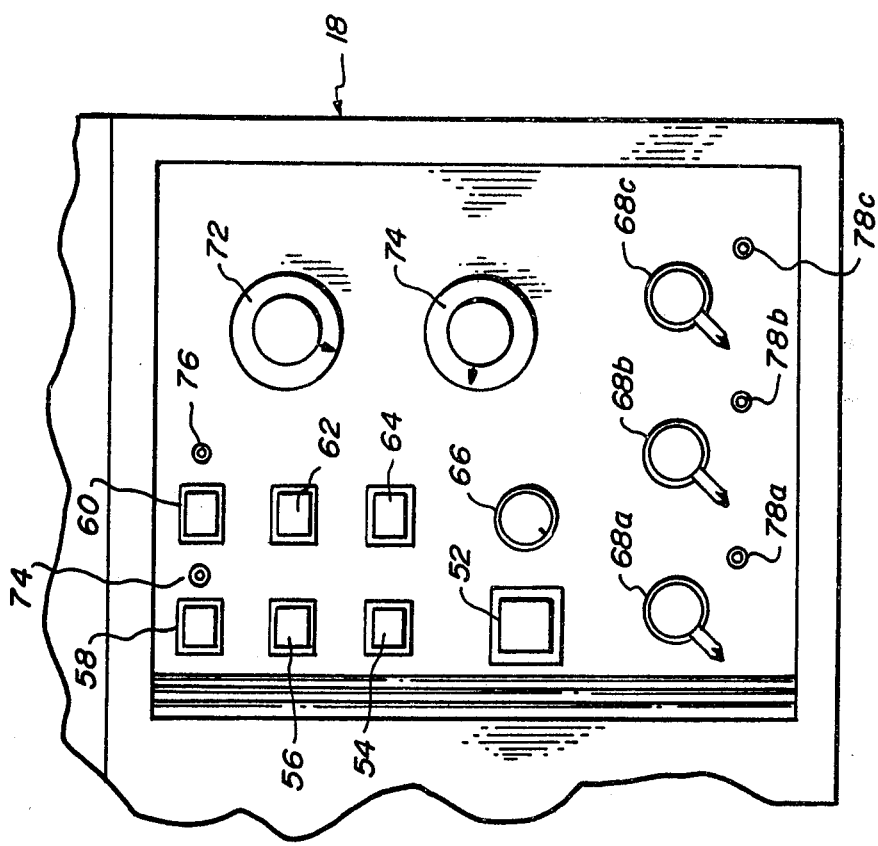
FIG. 3 shows the controls located on the operator panel.

FIG. 3 shows operator panel 18. The controls shown in FIG. 3 are POWER switch 52, EXPOSE switch 54, CLEAR switch 56, PAPER switch 58, PRINT-FOCUS switch 60, COLOR-B/W switch 62, RUN-TEST switch 64, preview lamp control 66, color controls 68a, 68b and 68c, COARSE density control 70, and FINE density control 72.

POWER switch 52 turns the printer power supply and lamphouse fan on and off. As shown in FIG. 3, POWER switch 52 is a rocker switch which is in the power-on position when rocked to the right and is in the power-off position when rocked to the left. When POWER switch 52 and a LAMP switch on lamphouse 14 are both on, the pilot lamp is lit.

EXPOSE switch 54 is a momentary switch which, when depressed by the operator, initiates one or more print cycles. The number of print cycles is determined by a multiple print counter located on control panel 20. The operation of EXPOSE switch 54 is limited by a Microswitch which senses whether a negative mask is in place. If a negative mask is not in position in the printer, depressing EXPOSE switch 54 causes only the print lamps to increase to high intensity. The remainder of the print cycle will not occur unless a negative mask is inserted.

CLEAR switch 56 is a momentary switch which clears the electronic logic if an exposure or paper feed cycle is begun but not completed. After the logic is cleared, a new print cycle may be attempted.

PAPER switch 58 is a momentary switch which initiates a paper feed cycle. The distance the paper travels is determined by either indicia on papermask 50 (automatic operation) or digital paper feed count switches on control panel 20 (manual operation). While the paper is advancing and the LAMP switch (on lamphouse 14) is on, an indicator lamp 74 to the right of PAPER switch 58 is on.

PRINT/FOCUS switch 60 is a rocker switch which, when in the PRINT position (rocked left) allows normal operation of the printer. PRINT/FOCUS switch 60 must be in the PRINT position during printing.

The FOCUS position (rocked right) of PRINT/FOCUS switch 60 is used only while focusing the printer. In FOCUS, print lamps 32 are increased to high intensity and shutter paddle 42 swings out of the light path. An indicator lamp 76 to the right of PRINT/FOCUS switch 60 lights when PRINT/FOCUS switch 60 is in the FOCUS position.

COLOR-B/W switch 62 selects a color or black and white printing mode for the printer. In the black and white mode, only the blue circuitry, yellow color controls, and density controls function. Only the density controls are used for density modification. In the color mode, all circuits, color controls and density controls function.

RUN/TEST switch 64 enables or disables the automatic paper feed circuitry and shutter paddle 42. In TEST, the function of the color and density controls may be checked. The function of shutter paddle 42 is disabled. No paper is exposed while RUN/TEST switch 64 is in the TEST position. RUN/TEST switch 64 must be in the RUN position during printing.

Preview lamp control 66 is a control knob which increases the intensity of the preview lamp with a clockwise turn. A counterclockwise turn decreases preview lamp intensity.

Color controls 68a, 68b, and 68c regulate the exposure time for the red, green and blue emulsion layers of the photographic print paper. A clockwise turn of a color control knob increases color density.

Indicator lamps 78a, 78b and 78c, which are located to the lower right of color controls 68a, 68b and 68c, respectively, show the duration of the exposure in that color channel. When the exposure begins, all three indicator lamps light. Each goes out as the exposure in its color channel is completed. For black and white printing, indicator lamp 78c shows the exposure duration.

COARSE and FINE density controls 70 and 72 regulate the exposure time of the printer. In the embodiment shown in FIG. 3, each increment of COARSE density control 70 yields an exposure time twice as long and a density increase of 0.7 points from the setting below it.

Each increment on the FINE density control 72 increases exposure time about 5 percent and the density about 0.04 points above the setting below it.

Figure 4:
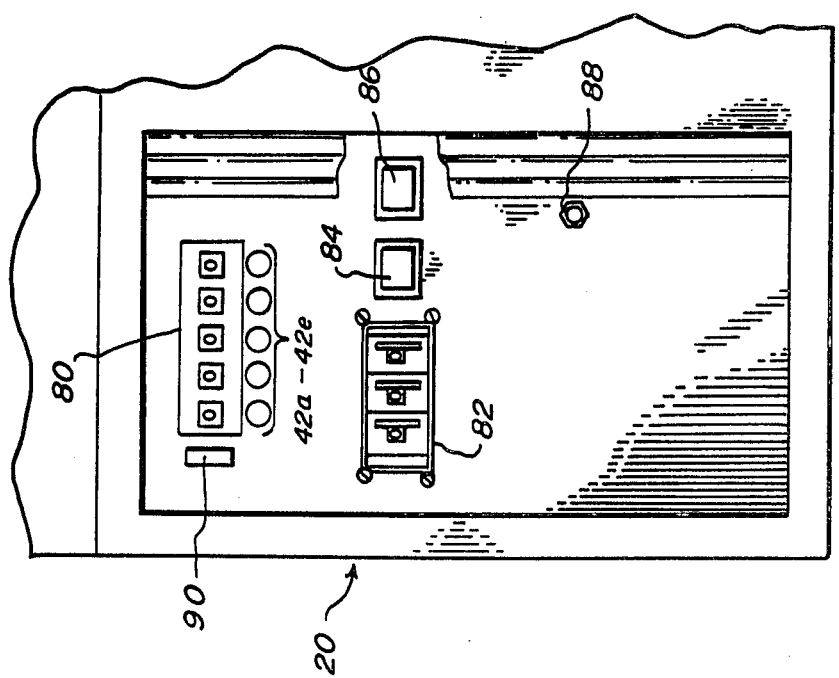
FIG. 4 shows the controls located on the control panel.

FIG. 4 shows the controls located on control panel 20. The controls include MULTIPLE PRINT counter 80, PAPER FEED COUNT switches 82, PAPER AUTO/MAN switch 84, EXPOSURE AUTO/MAN switch 86, and SENSORS ON/OFF switch 88.

MULTIPLE PRINT counter 80 can be set for any number of prints up to 99,999. The printer will make that number of prints (of the same negative) automatically after an exposure is initiated.

To set MULTIPLE PRINT counter 80, button 90 to the left of counter 80 is depressed and held. Each of the buttons 92a-92c below each digit of counter 80 is depressed and released as many times as necessary until the required number is registered. Button 90 is then released.

When a multiple print cycle is initiated, the printer will make the number of prints registered on counter 80. With each print, the number on counter 80 is decremented by one. When the number on counter 80 reaches "00000", the multiple print cycle is terminated. Depressing button 90 resets counter 80 to the number previously set.

If the multiple print cycle stops for some reason prior to reaching "00000", counter 80 freezes in position. When printing is resumed, the printer will cycle the number indicated on counter 80.

PAPER FEED COUNT switches 82 control the length of paper feed when PAPER AUTO/MAN switch 84 is in the "MAN" position. PAPER FEED COUNT switches 82 are three 10-position thumbwheel switches (settings 0 through 9). In a preferred emobdiment, increasing switches 82 one position produces the following increase in paper feed travel: right switch 0.5 mm, center switch 5 mm, and left switch 50 mm.

PAPER AUTO/MAN switch 84 controls the mode of paper feed. In the "MAN" position, paper feed length is controlled by PAPER FEED COUNT switches 82. The paper feed in AUTO is controlled by indicia associated with the paper mask which is in use.

EXPOSURE AUTO/MAN switch 86 enables or disables the automatic printing cycle. When in AUTO, the print cycle begins when a negative mask is inserted in position in the neghold base. In MAN, EXPOSE switch 54 on operator panel 18 must be depressed to start the print cycle.

SENSORS ON/OFF switch 88 controls the photocells of photocell sensor ring 38 of the lensdeck. With the switch ON, the photocells determine the exposure times in each color channel. With the switch OFF, the photocells are disabled, and the exposure times are fixed and can be controlled by color controls 68a, 68b and 68c and density controls 70 and 72.

The remaining external controls are the paperdeck and lensdeck adjustment handwheels located on cabinet 10, and a LAMP ON/OFF switch and DICHROIC FILTER controls located on lamphouse 14.

The LAMP ON/OFF switch turns on the print lamps, the preview lamp, a "power on" indicator lamp and a digital timing clock (when present). The print lamps 32 operate at low intensity until a print, focus, or test cycle is begun. When the LAMP ON/OFF switch is OFF, all lights on the printer are off, enabling loading/unloading of the print paper (when the room is darkened) without turning the printer off.

The DICHROIC FILTER controls are located on the side of lamphouse 12 to control the position of dichroic filters 34 in the light path. A four-digit counter is associated with the control knob for each filter to assist in setting the filters on a consistent basis.

Mechanical System

FIGS. 5–14 show various portions of the mechanical system of the printer. The mechanical system will be described in a "top-down" order, beginning with the lamphouse and ending with the paperdeck and paper masks.

(1) Lamphouse

FIGS. 5a–5c show front, partial cutaway top and side views, respectively, of lamphouse 14. Print lamps 32a and 32b produce the high intensity light required for photographic printing. The light passes through the dichroic filter assembly 34, which modifies the color of the light, and out of the lamphouse through window 90.

Lamps 32a and 32b generate a substantial amount of heat which must be removed from the lamphouse. Heatsink 92 is a blackened, baffled assembly which is mounted around the lamps. In addition, a cooling fan is mounted within the heatsink 92 behind lamps 32a and 32b. Fan cover 94 in the rear of lamphouse 14 is baffled to assist in the cooling.

On the front surface of lamphouse 14 is the LAMP ON/OFF switch 96. As described previously, LAMP ON/OFF switch 96 turns on the print lamps, the preview lamp, the power on pilot lamp, and a timer clock (when present).

On the right side of lamphouse 14 are controls 98 and 98c, which control the position of the cyan, magenta and yellow dichroic filters. Controls 98a–98c each include a setting knob and a four-digit counter.

(2) Color Mixing Chamber

Figure 6B:
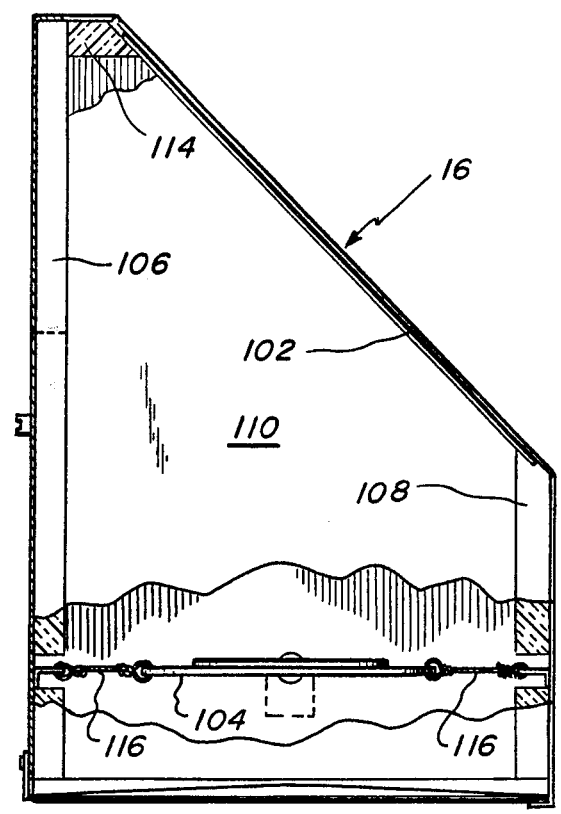
FIGS. 6a and 6b show the color mixing chamber.
Figure 6A:
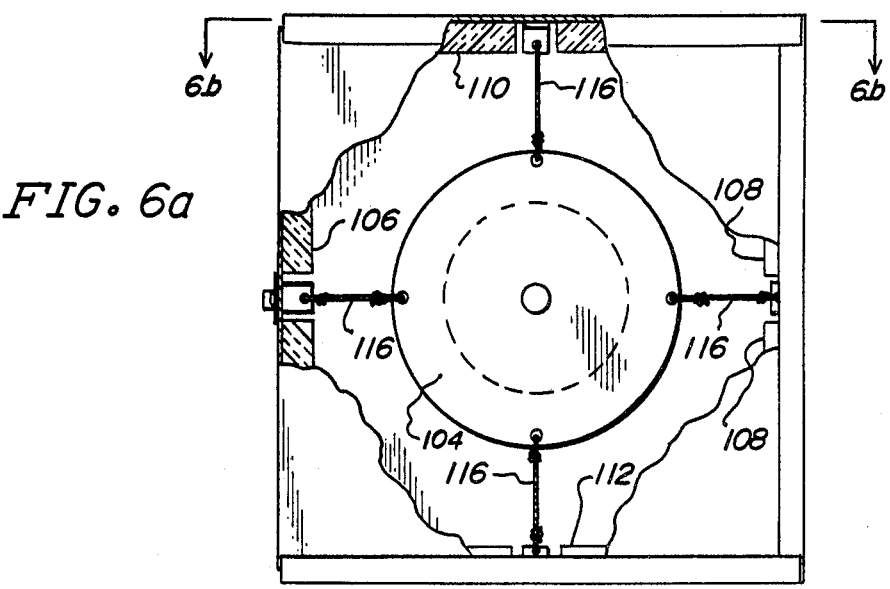

FIGS. 6a and 6b show top and cross-sectional side views, respectively, of color mixing chamber 16. The purposes of color mixing chamber 16 are (1) to change the direction of the light from horizontal (when leaving lamphouse 14) to vertical downward into cabinet 10, and (2) to mix and diffuse the light to remove "hot spots" and provide a uniform light distribution at the negative.

Light from lamphouse 14 enters chamber 16 through opening 100, which matches window 90. The light is reflected downward by diffuse reflector 102. Diffuser assembly 104 further diffuses the light before it passes out the bottom of chamber 16.

Diffuse reflector 102 is preferably a white porcelain member. It has been discovered that white porcelain provides the desired diffuse reflection and is capable of withstanding the very intense radiation from lamps 32a and 32b. Other diffuse reflector materials, such as styrofoam, degrade when exposed to the very intense radiation.

Diffusion within chamber 16 is further aided by styrofoam members 106, 108, 110, 112 and 114 on the walls of chamber 16. The styrofoam members act as diffuse reflector for light which strikes the walls of chamber 16.

Diffuser assembly 104 is a circular ground glass diffuser which is supported by wires 116. Light is distributed evenly across the negative by diffuser assembly 104.

(3) Neghold, Preview Station and Negative Mask

Figure 7A:
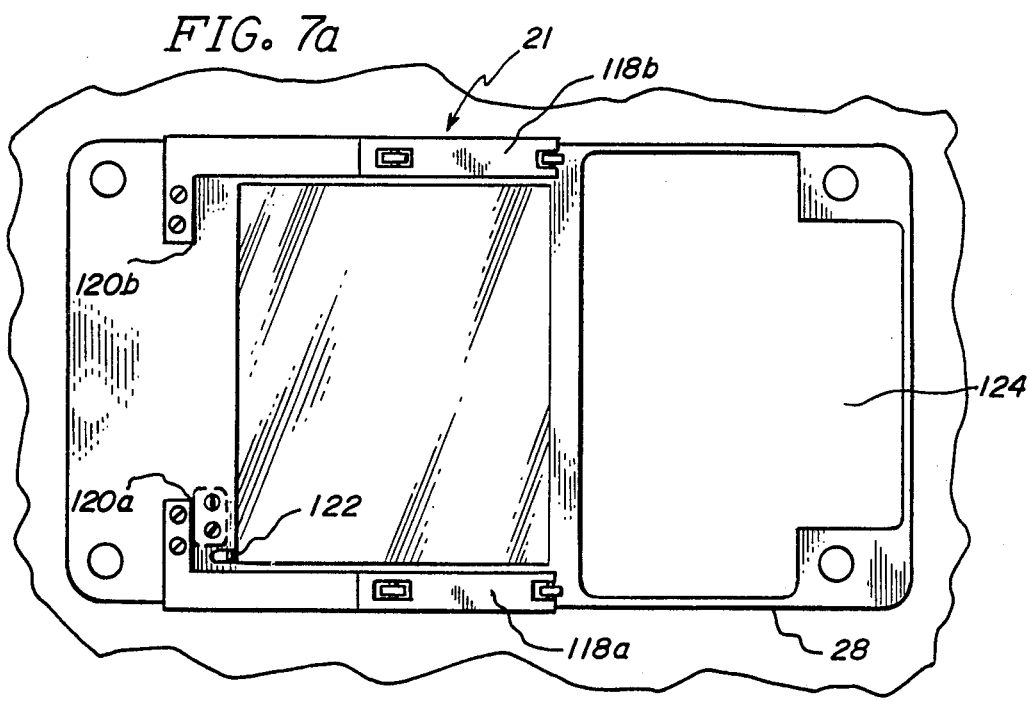
FIGS. 7a and 7b show the neghold and preview station.
Figure 7B:
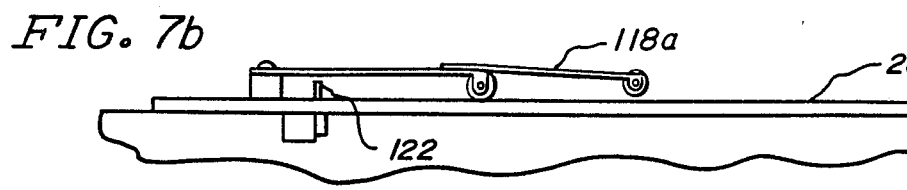

FIGS. 7a and 7b show top and left side views of the neghold 21 and preview station 28. The negative is held in a negative mask (not shown), which is moved into place in neghold 21 by sliding the mask under roller assemblies 118a and 118b. Stops 120a and 120b define the rear limit for the negative mask.

Microswitch 122 near the rear of neghold 21 is depressed when a negative mask is in place in neghold 21. The operation of the EXPOSE switch 54 on operator panel 18 (FIG. 3) is inhibited when microswitch 122 is not depressed. When the negative mask is not in position, depressing the EXPOSE switch causes only the print lamps 32a and 32b to increase to high intensity. The remainder of the print cycle does not occur until the negative mask is inserted in neghold 21 and microswitch 122 is depressed.

The preview station 28 includes a white translucent plastic plate 124 which is mounted over a preview lamp (not shown). Prior to sliding the negative mask into the neghold, the negative and negative mask are positioned over plate 124 where the negative can be viewed by the operator.

Figure 8A:
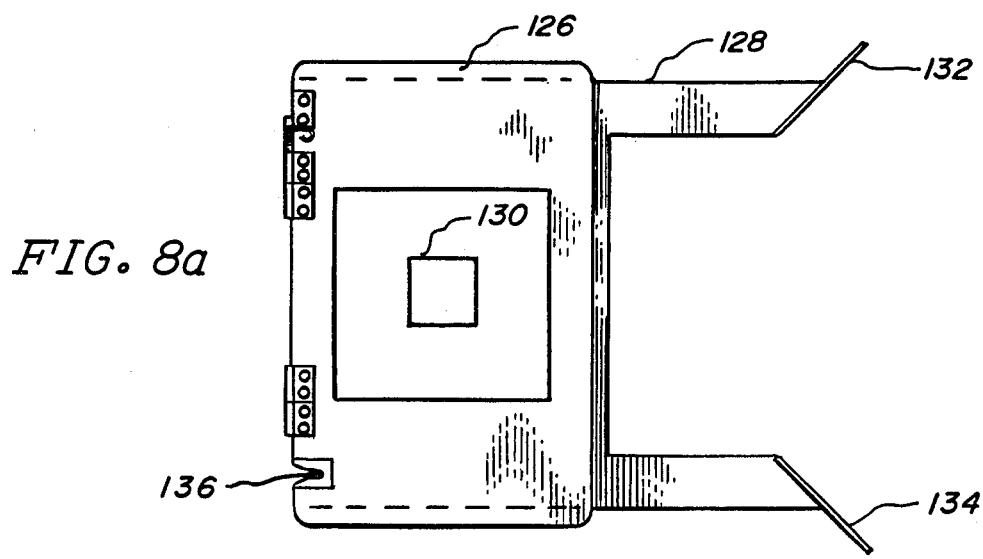
FIGS. 8a and 8b show a typical negative mask or carrier.
Figure 8B:
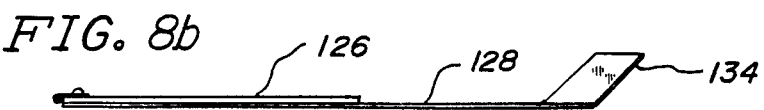

FIGS. 8a and 8b show top and side view of a typical negative mask 36 for use with the printer. Mask 36 is a hinged, two-piece assembly which can be slid under roller assemblies 118a and 118b of neghold 21.

A negative is inserted between top 126 and bottom 128 plates of mask 36. Top and bottom plates 126 and 128 have an opening 130 through which light can pass. The size of opening 130 is determined by the size of the particular negative to be held. The negative is positioned under opening 130 in top plate 126.

Mask 36 is inserted into position in neghold 21 by pushing members 132 and 134 so that mask 36 slides under roller assemblies 118a and 118b. Notch 136 in mask 36, which is aligned with microswitch 122 of neghold 21, ensure that microswitch 122 is not depressed until mask 36 has been pushed all the way to the rear of neghold 21.

(4) Lensdeck and Paperdeck Positioning System

Figure 9:
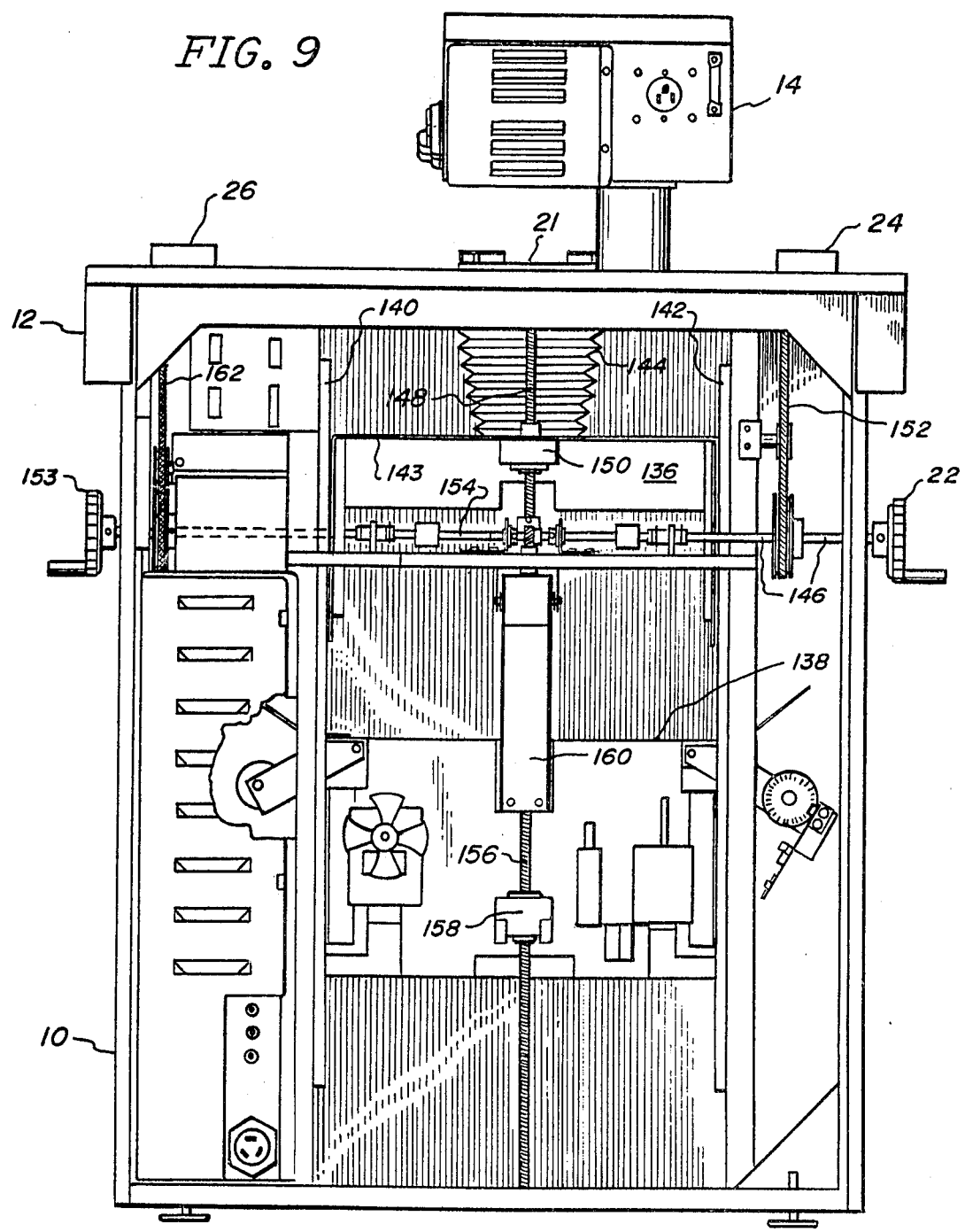
FIG. 9 is a rear view of the cabinet, showing the lensdeck and paperdeck positioning systems.

FIG. 9 shows a rear view of cabinet 10. The rear doors have been removed for clarity.

Lensdeck 136 and paperdeck 138 each may be moved up and down along slide rails 140 and 142. Movement of lensdeck 136 and paperdeck 138 allows adjustment of focus of the printer for the wide variety of negative size-print size combinations which may be desired.

Lensdeck 136 includes the lens, shutter paddle and filter paddle assemblies which are attached to lensdeck carriage 143 and which will be described in detail in a later section. Lensdeck 136 also includes a rectangular shaped bellows 144. As lensdeck 136 is moved downward, bellows 144 is extended; as lensdeck 136 is moved upward, bellows 144 contracts.

Movement of lensdeck 136 is produced by turning lensdeck adjustment handwheel 122. The turning of handwheel 22 causes rotation of shaft 146, which drives helical lead screw 148 through a helical gear. Lead screw 148 passes through threaded member 150, which is fixed to lensdeck 136. Rotation of lead screw 148, therefore, causes lensdeck 136 to move either up or down on rails 140 and 142, depending on the direction of rotation.

Rotation of shaft 146 also drives a pulley 152, which in turn drives lensdeck counter 24. The count on lensdeck counter 24 is used for reference in setting the position of lensdeck 136.

Adjustment of the position of paperdeck 138 is generally similar to the adjustment of the lensdeck position. A paperdeck adjustment handwheel 152 adjusts the position of paperdeck 138. Rotation of handwheel 152 and, therefore, shaft 154 drives helical lead screw 156 through a second helical gear. Lead screw 156 passes through threaded member 158, which is attached to paperdeck 138.

Movement of paperdeck 138 is assisted by coil-type negator spring 160. The weight of paperdeck 138 is counteracted by negator spring 160, so that the entire weight of paperdeck 138 is not resisting movement by handwheel 152.

Shaft 154 also drives pulley 162, which in turn drives paperdeck counter 26. The count on paperdeck counter 26 may be used in setting the position of paperdeck 138.

(5) Lensdeck

Figure 10B:
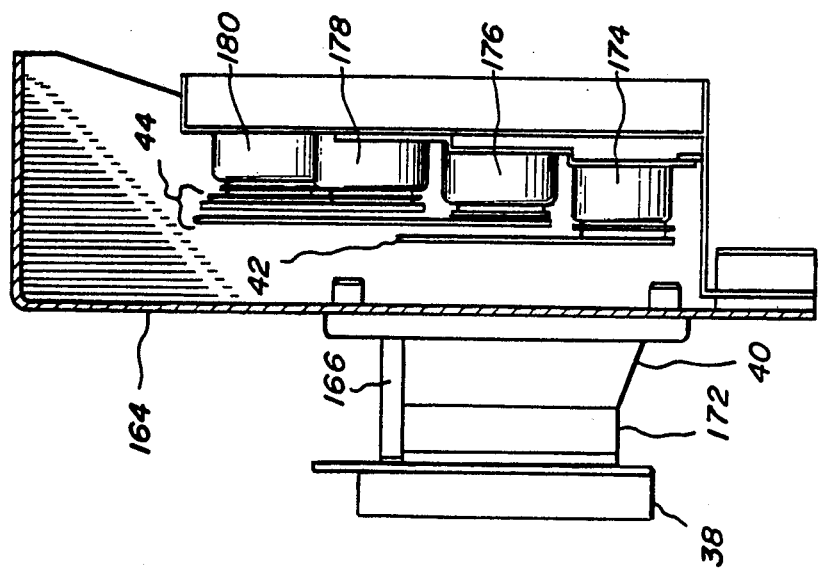
FIGS. 10a and 10b show the lensdeck assembly.
Figure 10A:
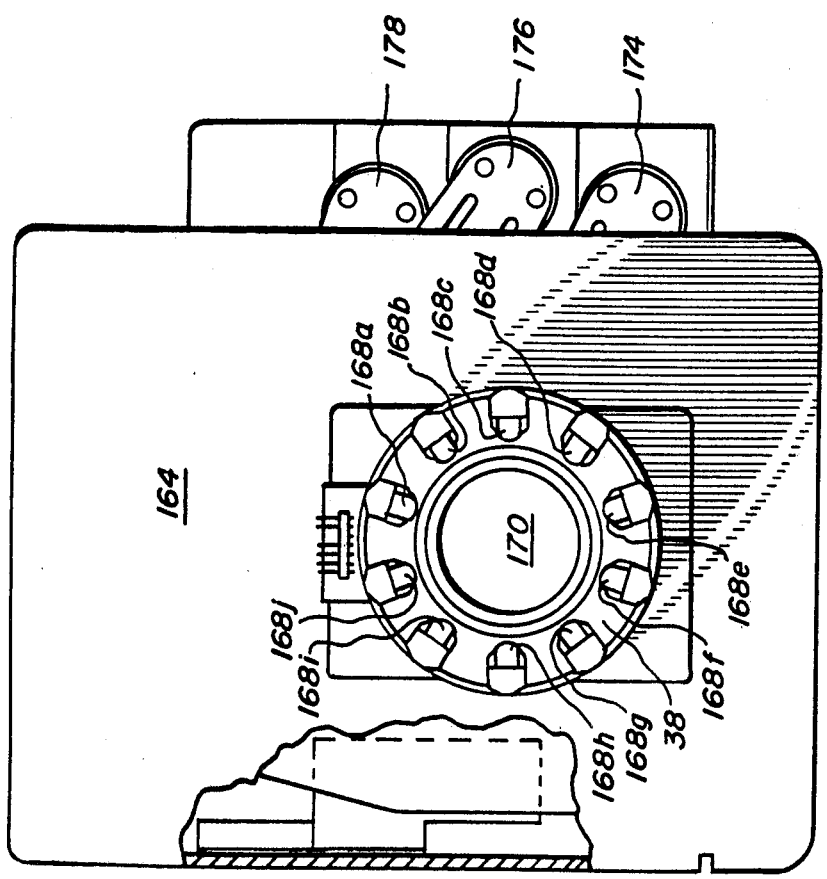

FIGS. 10a and 10b show top and side views of the lensdeck assembly which is attached to lensdeck carriage 143 (FIG. 9). The lensdeck assembly includes photocell sensor ring 38, lens and lens mount 40, shutter paddle 42, and filter paddles 44.

Photocell sensor ring 38, which is mounted over lensdeck plate 164 by spacer 166 includes ten photocells 168a–j, positioned in a ring around opening 170. Most of the light from the negative passes through opening 170, but a portion of the light is sensed by photocells 168a–j. In one preferred embodiment, photocells 168a–j are CdS photocells with filters over each cell to limit the spectral response to red, blue or green. The photo signals from the photocells are used to control exposure time for the various colors.

Lens and lensmount 40 is held in position by permanent magnet 172. The magnetic field of permanent magnet 172 is strong enough to allow lens and lensmount 40 to hang below magnet 168. The use of magnet 172 simplifies mounting and changing of lenses in the printer.

Shutter paddle 42 is driven into and out of the light path by solenoid 174. The three filter paddles 44 are driven into and out of the light path by solenoids 176, 178 and 180.

(6) Paperdeck and Paper Mask

The printer of the present invention requires a paper drive mechanism which advances the paper by the proper amount between print cycles so that successive prints do not overlap and yet are not so spaced apart that print paper is wasted. From both a cost and reliability standpoint, the paper feed mechanism should be as simple as possible.

Figure 11A:
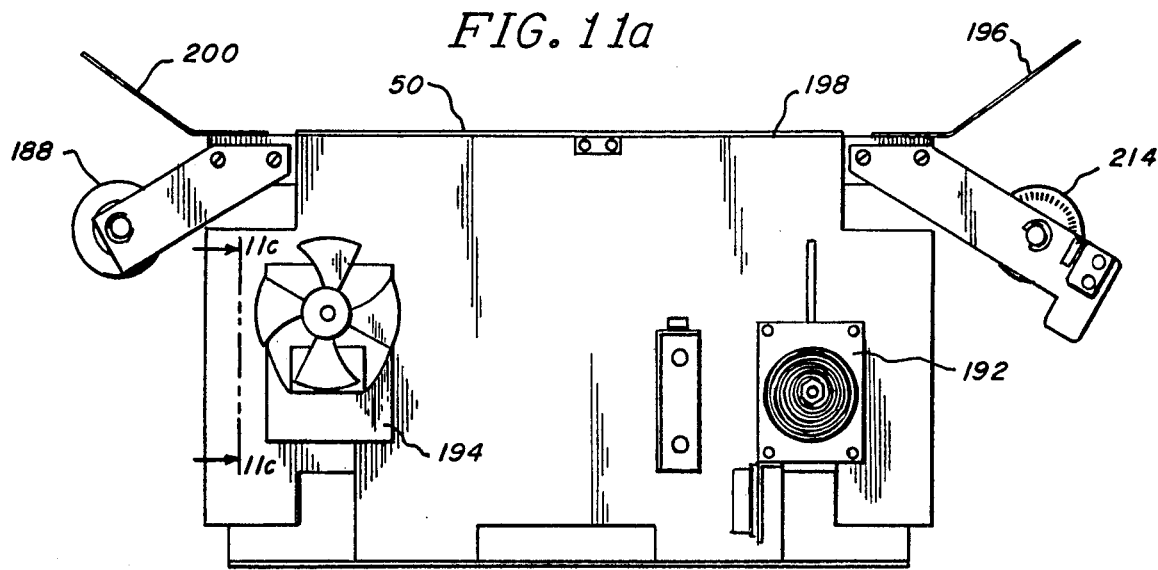
FIGS. 11a–11c are rear, left side, and partial right side views of the paperdeck.
Figure 11B:
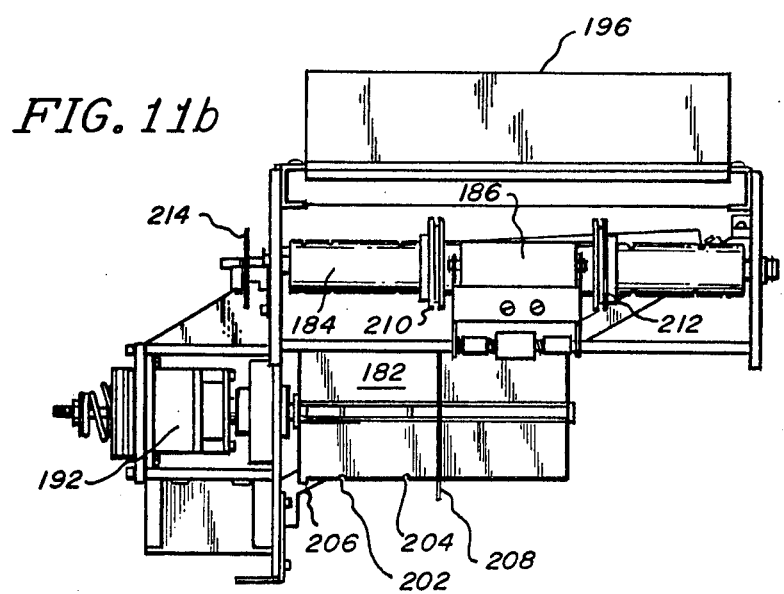
Figure 11C:
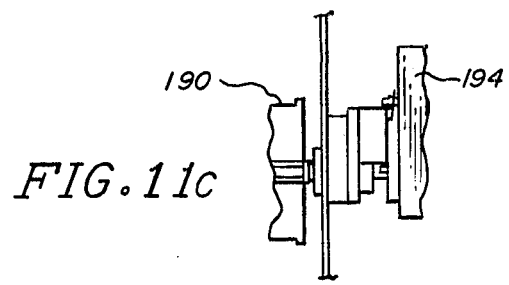

FIGS. 11a, 11b and 11c show rear, left side and partial right side views, respectively, of the paperdeck of the printer of the present invention. The paper drive mechanism of the paperdeck includes paper supply roller 182, supply metering roller 184, pressure roller 186, take-up metering roller 188, take-up roller 190, brake 192 and motor 194.

The print paper is fed from a paper roll (not shown) which is press fit onto paper supply roller 182, between supply metering roller 184 and pressure roller 186, under light shield 196, across the top surface 198 of the paperdeck, under paper mask 50, under light shield 200, over take-up metering roller 188, and onto take-up roller 190. A significant advantage of this system is that the paper drive is achieved by a single motor 194, which drives take-up roller 190. Advance of the paper is halted by signals to both motor 194 and brake 192, which halts rotation of paper supply roller 182.

The paper drive mechanism shown in FIGS. 11a–11c accommodates print paper of several different widths. Paper supply roller 182 and take-up roller 190 have several similarly spaced grooves. For example, paper supply roller 182 has grooves 202 and 204, as well as shoulder 206, and take-up roller 190 has similarly spaced grooves and shoulder. A guide ring 208 is positioned on paper supply roller in the appropriate groove for the particular width of paper roll to be used. A similar guide ring is positioned in the comparable groove on take-up roller 190. FIGS. 12a and 12b show a typical guide ring.

Supply metering roller 184 and take-up metering roller 188 also have a plurality of spaced grooves. Slip rings 210 and 212 are positioned in the appropriate grooves in roller 184 for a particular paper width, and two similar slip rings are placed on roller 188.

The loading of print paper is as follows. First, the guide rings are positioned on supply roller 182 and take-up roller 190. Second, the slip rings are positioned on rollers 184 and 188. Third, an empty paper core is pushed onto take-up roller 190 until stopped by the guide ring. Fourth, a print paper roll with the emulsion side out, is pushed onto supply roller 182 until stopped by guide ring 208. Fifth, the paper is threaded between supply metering roller 184 and pressure roller 186. Slip rings 210 and 212 define the position of the paper on roller 184. Sixth, the paper is threaded under light shield 196, across surface 198, under light shield 200, over take-up metering roller 188 and onto the empty paper core on take-up roller 190. The paper is wound onto roller 190 with the emulsion side in.

The proper amount of paper advanced after each print exposure is determined by the number set by the PAPER FEED COUNT switches 82 on the control panel 20 (see FIG. 4) if the PAPER AUTO/MAN switch 84 is on the "MAN" position. If switch 84 is in the "AUTO" position, the paper feed is determined by indicia on paper mask 50.

The amount by which the paper has advanced is sensed by means of a disk 214 which is attached to supply metering roller 184. Disc 214 has a plurality of equally spaced rectangular apertures around its periphery. A light emitting diode (LED) and a photosensor (not shown) are positioned on opposite sides of disc 214. As supply metering roller 184 and, therefore, disc 214 turn, light from the LED reaches the photosensor and an electrical pulse is generated each time an aperture passes. By counting pulses, it is possible to determine how far the paper has advanced. When the paper has advanced by the amount determined by the number set by either the PAPER FEED COUNT switches (manual operation) or the indicia on the paper mask (automatic operation), the drive to motor 194 is removed and brake 192 is energized, thereby halting the paper feed.

As mentioned above, indicia on the paper mask 50 determine the distance the paper will travel when the PAPER AUTO/MAN switch is in the AUTO position. FIG. 13 is a top view of a typical paper mask.

Paper mask 50, as shown in FIG. 13, has a mask opening 216 which defines the paper to be exposed. The size of opening 216 varies from mask to mask. Typical sizes include 3½ × 2½, 3½ × 5, 5 × 4, 5 × 7, 8 × 8, 8 × 10, and 9.4 × 11.8 inches.

Near the rear edge of mask 50 are three groups 218, 220 and 222 of threaded holes. Groups 218 and 220 each contain four threaded holes and group 222 contains three threaded holes. When paper mask 50 is installed on the paperdeck, the holes are positioned directly over Paper Feed Microswitches. Screws may be inserted in the holes to depress selected ones of the Paper Feed Microswitches. In the preferred embodiment group 218 represents "ones", group 220 represents "tens" and group 222 represents "hundreds" in the desired feed count. The number is in binary coded decimal (BCD) format.

The feed count on the mask may be factory set if desired. It is generally preferable, however, to allow the photofinisher to set the feed count. This allows the photofinisher to "fine tune" the feed length for each mask to achieve his standard border size. Various photofinishers prefer slightly different border sizes, and allowing the photofinisher to set the screws in groups 218, 220 and 222 accommodates these variations. Once the feed count has been set (either at the factory or by the photofinisher) it generally will not be changed.

Although the threaded hole-screw-microswitch arrangement is a preferred technique of automatically controlling feed length, other techniques may be used. For example, other forms of indicia and indicia sensors may be used. In each case, the indicia is associated with the paper mask and provides the desired feed count for that particular mask size.

Figure 14A:
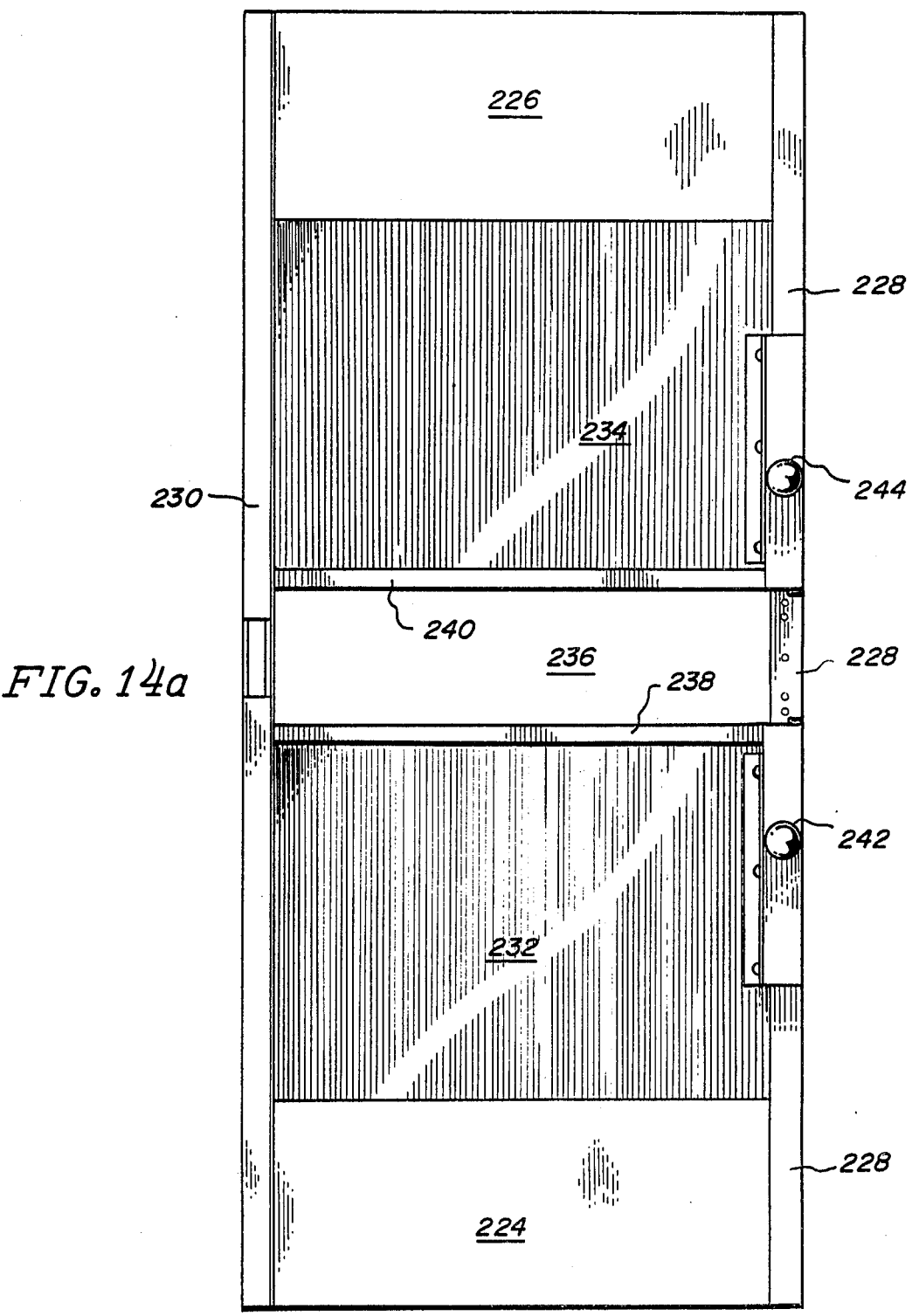
FIGS. 14a and 14b show a universal paper mask.
Figure 14B:
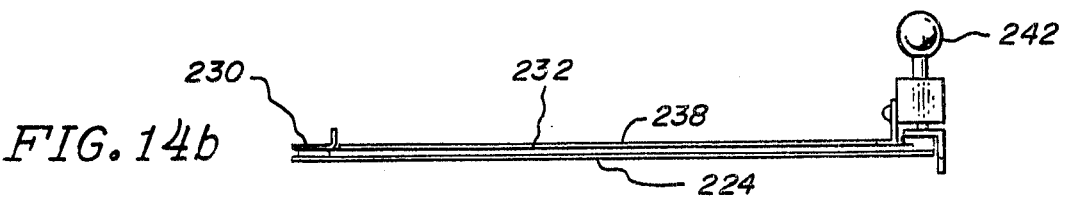

An alternative to individual masks is a "universal" paper mask which is adjustable for various print sizes. FIGS. 14a and 14b show top and side views of a universal paper mask for use with the printer of the present invention.

The universal mask includes base members 224 and 226, which are held by locating bar 228 and rear stiffening bar 230. Left and right light shields 232 and 234 are slidable to define the sizes of opening 236. Attached to the edges of light shields 232 and 234 are light seal brackets 238 and 240, respectively. The positions of light shields 232 and 234 are determined by locator pins 242 and 244, respectively, which are inserted into the desired holes in locator bar 228.

When the universal mask of FIGS. 14a and 14b is used, the MAN rather than the AUTO paper feed is used. In other words, the paper feed length is determined by the paper feed count switches 82 on the control panel 20 (FIG. 4) rather than indicia associated with paper mask.

Electrical System

FIGS. 15–21 are schematic diagrams for the major electrical subsystems of the printer. Each Figure preferably represents an individual circuit board.

(1) Control Panel

Figure 15:
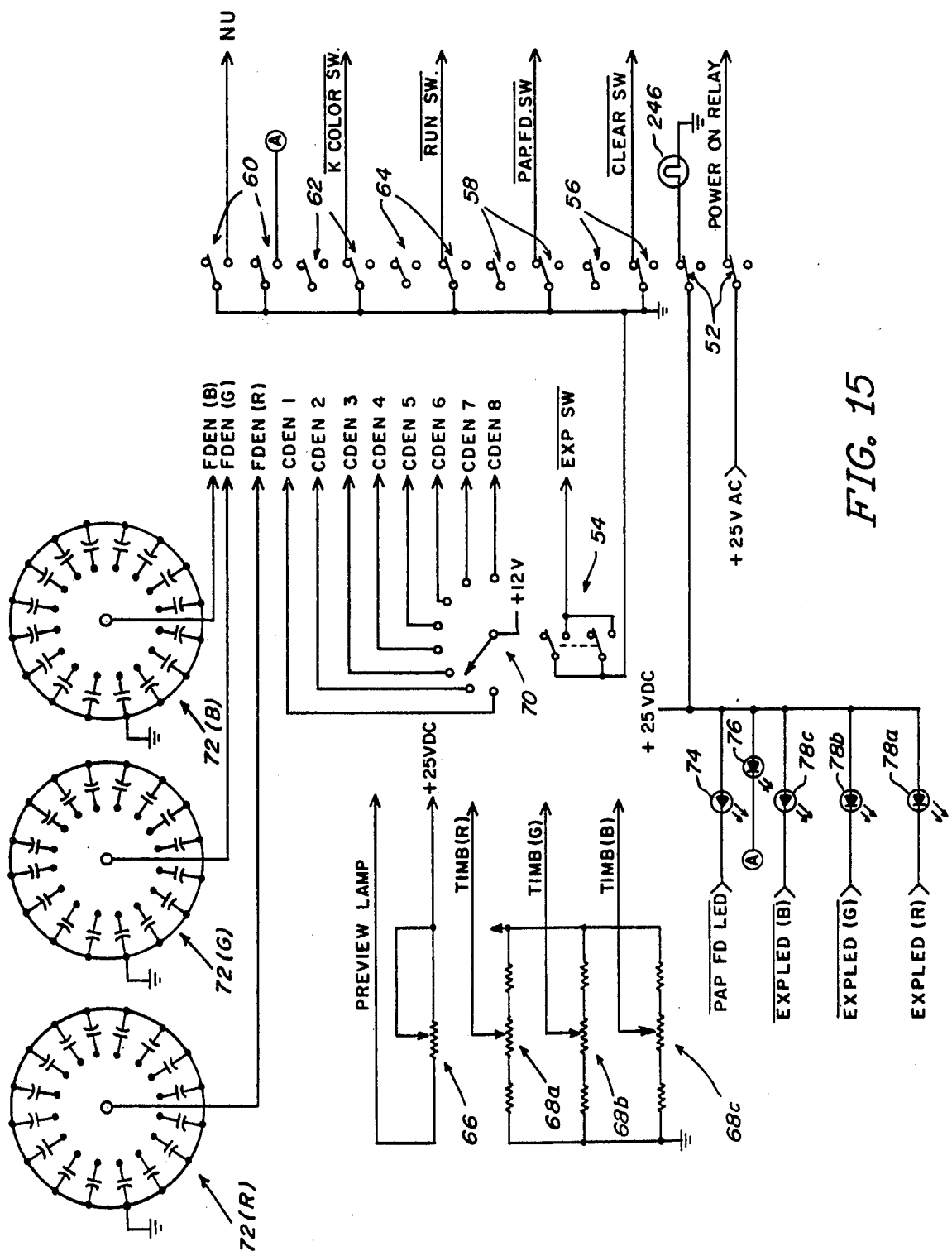
FIG. 15 schematically shows the control panel.

FIG. 15 is a schematic diagram of the control panel. The physical appearance of the control panel is shown in FIG. 3.

POWER switch 52, when in the power on position, energizes the power on relay, which turns on the printer power supply and lamphouse fan. Indicator lamp 246 is energized when power switch 52 is in the power on position.

EXPOSURE switch 54 is a momentary switch which provides the EXP SW signal to the cycle control circuit when depressed. The EXP SW signal initiates one or more print cycles, provided that the negative mask is in place.

CLEAR switch 56 is a momentary switch which provides the CLEAR SW signal to the cycle control circuit. This signal clears the electronic logic when an exposure or paper feed cycle is begun but not completed.

PAPER switch 58 is a momentary switch which provides the PAP FD SW signal to the paper feed control circuit. The PAP FD SW signal initiates a paper feed cycle.

When PRINT/FOCUS switch 60 is in the PRINT position, normal operation of the printer is permitted. The FOCUS position, which is used only while focusing the printer, causes indicator lamp to be energized.

COLOR-B/W switch 62 selects a color or black and white printing mode from the printer. $\overline{\text{K COLOR SW}}$ signal is provided by COLOR-B/W switch 62 to the cycle control circuit.

RUN/TEST switch 64 provides the $\overline{\text{RUN SW}}$ signal to the blue, green and red exposure control circuits, the cycle control circuit, and the paper feed control circuit. This signal enables or disables the automatic paper feed and the shutter paddle.

Preview lamp control 66 is a variable resistor. Clockwise movement of the control knob moves the wiper arm to reduce the resistance and thereby increase the intensity of the preview lamp.

Color controls 68a, 68b and 68c are variable resistor circuits which provide the TIMB (R), TIMB (G) and TIMB (B) signals to the red, green and blue exposure control circuits, respectively. These signals regulate the exposure time for the red, green and blue emulsion layers of the photographic print paper. A clockwise turn of a color control increases the value of the corresponding TIMB signal, which results in an increase in color density.

Coarse density control 70 is a multiple position switch. Depending on the position selected, one of the coarse density signals CDEN1–CDEN8, is a "1". Signals CDEN1–CDEN8 are provided to the red, green and blue exposure control circuits. Each position of control 70 yields an exposure time twice as long and a density increase of 0.7 points from the position immediately below it.

Fine density control 72 is a multiple position switch having three separate sections for red, green and blue. The FDEN (B), (G) and (R) signals are provided to the blue, green and red exposure control circuits, respectively. Each position of the switch connects a different value of capacitance. The value of the capacitance increases with each position. Exposure time is increased by about 5 percent and density about 0.04 points with each increment.

Indicator lamps 78a, 78b and 78c are light emitting diodes (LEDs) which show the duration of the exposure in the red, green and blue color channels, respectively. They are energized by the $\overline{\text{EXPLED}}$ (R), (G) and (B) signals from the red, green and blue exposure control circuits. When the exposure begins, all three are lit; each goes out as the exposure in its color channel is completed.

(2) Sensor Ring and Exposure Control Circuits

Figure 16:
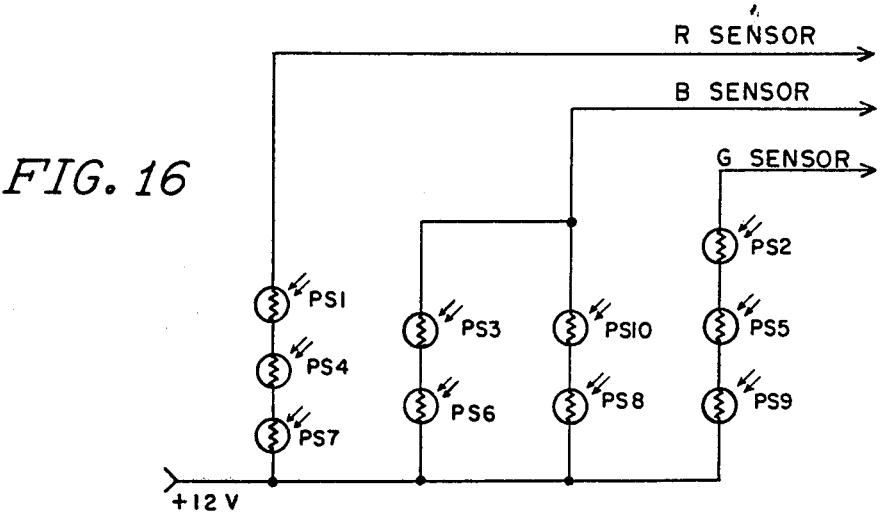
FIG. 16 shows a schematic diagram of the senior ring.

FIG. 16 is a schematic diagram of the photocell sensor ring. The "R SENSOR" and "G SENSOR" signals are produced by three CdS photocells each. Four CdS photocells produce the "B SENSOR" signal.

Figure 17:
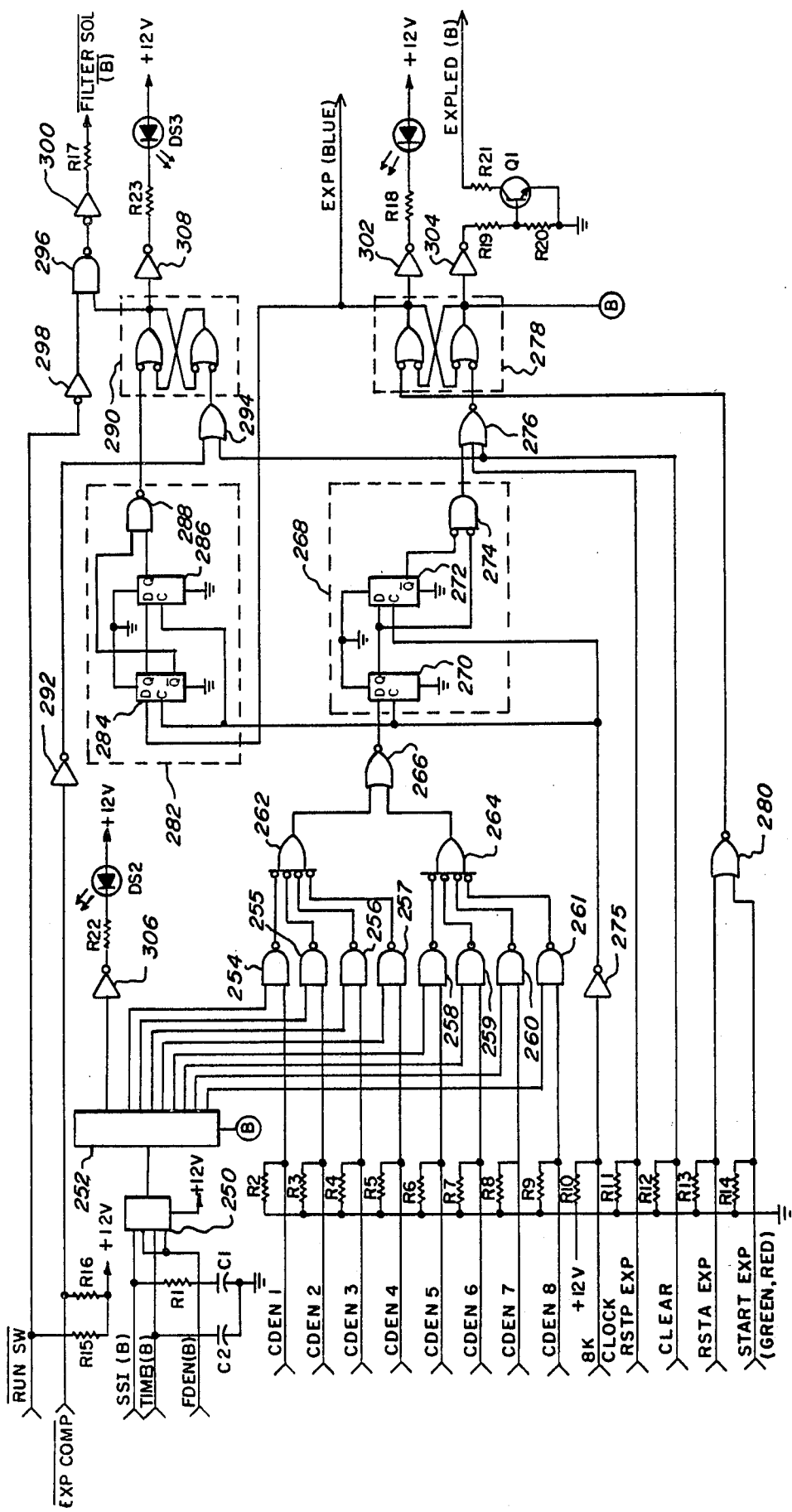
FIG. 17 is a schematic diagram of one of the three exposure control circuits.

FIG. 17 shows the blue exposure control circuit. The red and green exposure control circuits are identical to the blue exposure control circuit. The following discussion, therefore, will apply to all three circuits although specifically discussing the blue exposure control circuit.

The blue exposure control circuit receives signals from the control panel, the cycle control circuit (discussed later) and from the photocell sensor. The signals received from the control panel include the $\overline{\text{RUN SW}}$, TIMB (B), FDEN (B), and coarse density signals CDEN1-CDEN8. From the cycle control circuit the exposure control circuit receives the $\overline{\text{EXP COMP}}$, 8K CLOCK, CLEAR and STA EXP (GREEN RED) signals. The SSI signal is received from the photocells.

The output signals from the exposure control circuit are the $\overline{\text{FILTER SOL}}$ (B) signal (which energizes the blue filter solenoid), the EXP (BLUE) signal (which is used by the cycle control circuit), and the $\overline{\text{EXPLED}}$ (B) signal (which lights indicator lamp 78c on the control panel).

In many of the prior art printer systems, the exposure time is controlled automatically by the photocell signal by means of an analog integration of the photosignal. The integrated signal level required to terminate exposure is determined by density and color controls.

This technique, however, has certain drawbacks. In particular, in most photographic systems changes in density and color are on a logarithmic rather than a linear scale. Since the analog integration technique is not logarithmic, additional circuit complexity is required to convert the settings at the density and color controls, which read logarithmically, to the appropriate analog integration signal level.

The exposure control circuit of FIG. 17 overcomes these problems by means of an oscillator-counter system. Exposure oscillator 250 produces output pulses at a rate which is determined by the SSI, TIMB (B) and FDEN (B) inputs.

Inputs to exposure oscillator 250 receive SSI (B), TIMB (B) and FDEN (B). Resistor R1 is connected between the SSI (B) and FDEN (B) inputs, capacitor C1 is connected between FDEN (B) and ground, and capacitor C2 is connected between TIMB (B) and ground. The FDEN (B) input connects additional capacitance in parallel with C1. The setting of the fine density control 72 on the control panel determines the amount of that capacitance.

The output pulses from exposure oscillator 250 are received by binary counter 252. The Q6–Q13 outputs of counter 252 are NANDed with the coarse density signals CDEN1–CDEN8 by NAND gates 254–261. Depending upon the position of the coarse density switch, only one of the CDEN inputs will have a +12 volt level. This level is applied through one of the input resistors R2–R9 to an input of one of NAND gates 254–261. The outputs of NAND gates 254–261 are NORed by NOR gates 262, 264 and 266 so that the output of NOR gate 266 goes to "0" when a "1" at an output of counter 252 coincides with the "1" on one of the CDEN inputs.

The effect of the oscillator-counter arrangement shown in FIG. 17 is that each step of the coarse density switch increases the count required by a factor of two. A logarithmic type of exposure time control is achieved.

When the output of NOR gate 266 does to "0", it causes exposure and pulse generator 268 formed by flip-flops 270 and 272 and NAND gate 274 to produce a positive pulse of about 1.2 ms duration. Exposure and pulse generator 268 receives the 8K CLOCK input, which is a 8KHz clock signal generated in the cycle control circuit, and which is inverted by inverter 275.

The pulse from the exposure end pulse generator 268 is applied to NOR gate 276. The other two inputs to NOR gate 276 are the CLEAR and the RSTP EXP inputs. Under normal operation, both of the inputs remain "0" throughout the cycle, and the output of exposure end pulse generator 268 determines the output of NOR gate 276. The RSTP EXP input is an optional remote stop exposure signal which allows control of exposure time by an external control.

The output of NOR gate 276 is applied to the Reset input of exposure flip-flop 278. The Set input receives the output of NOR gate 280, which NORs the STA EXP (GREEN RED) and RSTA EXP signals. The STA EXP (GREEN RED) which is received from the cycle control circuit, normally starts the exposure cycle. The RSTA EXP is an optional remote start exposure signal to permit external control.

The commencement of exposure, designated by either the STA EXP of RSTA EXP signal going to "1" and the output of NOR gate 280 going to "0" sets exposure flip-flop 278. The Q output goes to "1" and the $\overline{Q}$ output goes to "0".

When the Reset pulse is received from NOR gate 276, exposure flip-flop is reset. This causes Q output to go to "0", which indicates that the blue exposure is complete and should be terminated. The EXP(BLUE) output, which is sent to the cycle control, is derived from the Q output of exposure flip-flop 278. The $\overline{Q}$ output is connected to the reset input of counter 252, thereby halting further operation of counter 252.

When exposure flip-flop 278 is reset, a set signal is generated by filter energize pulse generator 282 and is applied to the Set input of filter paddle flip-flop 290.

The Q output of exposure flip-flop 278 is also connected to filter energize pulse generator 282, which is formed by flip-flops 284 and 286 and NAND gate 288. Filter paddle flip-flop 290 is reset by the $\overline{\text{EXP COMP}}$ signal is inverted by inverter 292 and applied to one input of NOR gate 294. The CLEAR signal is applied to the other input. The output of NOR gate 294 is applied to the Reset input of filter paddle flip-flop 290.

The output of filter paddle flip-flop 290 is NANDed by NAND gate 296 with the $\overline{\text{RUN SW}}$ signal, which is inverted by inverter 298. When the RUN switch is in the RUN position and filter paddle flip-flop 290 is set, the output of NAND gate 296 goes to "0", which causes the blue filter solenoid to be energized. The $\overline{\text{FILTER SOL}}$ (B) signal is derived from the output of NAND gate 296 by inverter 300 and resistor R17.

The exposure control circuit includes three indicator lamp circuits and the drive circuit which produces the $\overline{\text{EXPLED}}$ (B) signal which drives indicator 78c on the control panel. The first of the three indicator circuits includes inverter 302, resistor R18, and light emitting diode DS1. DS1 indicates the duration of the exposure in the blue color channel. When exposure flip-flop 278 is set, DS1 is lit, and it remains lit until exposure flip-flop 278 is reset.

DS1 is lit concurrently with indicator 78c on the control panel. The drive circuit which produces the $\overline{\text{EXPLED}}$ (B) signal includes inverter 304, resistors R19, R20 and R21 and transistor Q1.

The second indicator circuit in the exposure control circuit is the exposure oscillator indicator circuit, which includes DS2, inverter 306 and resistor R22. DS2 is a LED which flashes when DS1 is lit and counter 252 is counting. DS2 indicates the cyclic electric pulse which times the exposure. Some exposure times are too fast for the flashing to be visible.

The third indicator circuit includes light emitting diode DS3, resistor R23, and inverter 308. DS3 lights when the blue channel has completed its exposure and another channel is still active (i.e. filter paddle flip-flop 290 is set). DS3 goes out when all channels have completed their exposure cycle (i.e. filter paddle flip-flop is reset).

The three exposure control circuits, together with the cycle control circuit discussed later, provide accurate and effective exposure time control for the three color channels. One advantageous feature not present in previous printers is that only the first two color channels to complete their exposure time cause their respective filter solenoids to drive their filter paddles into the light path. Rather than activate the filter solenoid, the last channel causes the shutter paddle to be driven into the light path. This terminates the exposure without the redundancy of driving the last of the three filter paddles into the light path.

This feature is accomplished by the use of filter energize pulse generator 282 and filter paddle flip-flop 290. The $\overline{\text{FILTER SOL}}$ signal is derived from filter paddle flip-flop 290 rather than directly from exposure flip-flop 278.

The delay between the reset of exposure flip-flop 278 and the production of a set pulse by filter energize pulse generator 282 to filter paddle flip-flop 290 is very short, but it is long enough to allow the cycle control circuit to receive the EXP signal and to produce the EXP COMP signal if the other two channels have already completed their exposure. If the $\overline{\text{EXP COMP}}$ signal is generated, the filter paddle flip-flop 290 is reset and the shutter paddle solenoid rather than the filter paddle solenoid is actuated.

(3) Solenoid Driver

Figure 18:
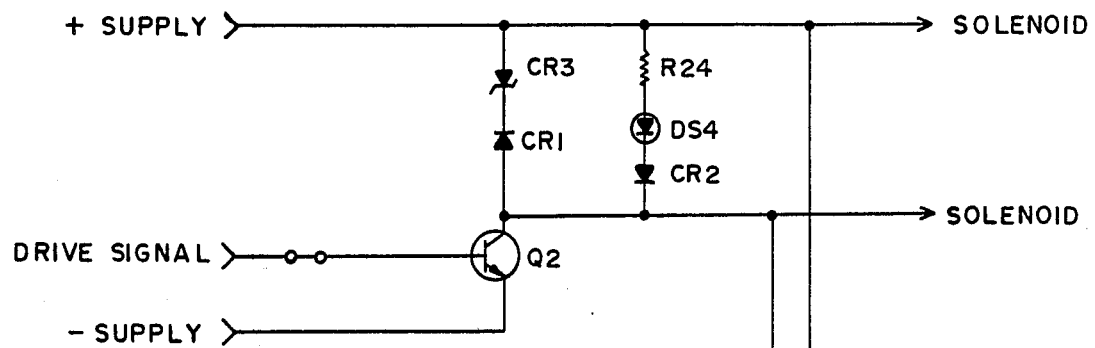
FIG. 18 is a schematic diagram of a typical solenoid driver circuit.

FIG. 18 shows a schematic diagram of a typical solenoid driver used in the printer. This solenoid driver is used to drive the filter paddle, shutter paddle and paper feed solenoids. The solenoid driver of FIG. 18 includes transistor Q2, diodes CR1 and CR2, zener diode CR3, resistor R24 and light emitting diode DS4.

(4) Aperture Pulse and Paper Feed Circuits

Figure 19:
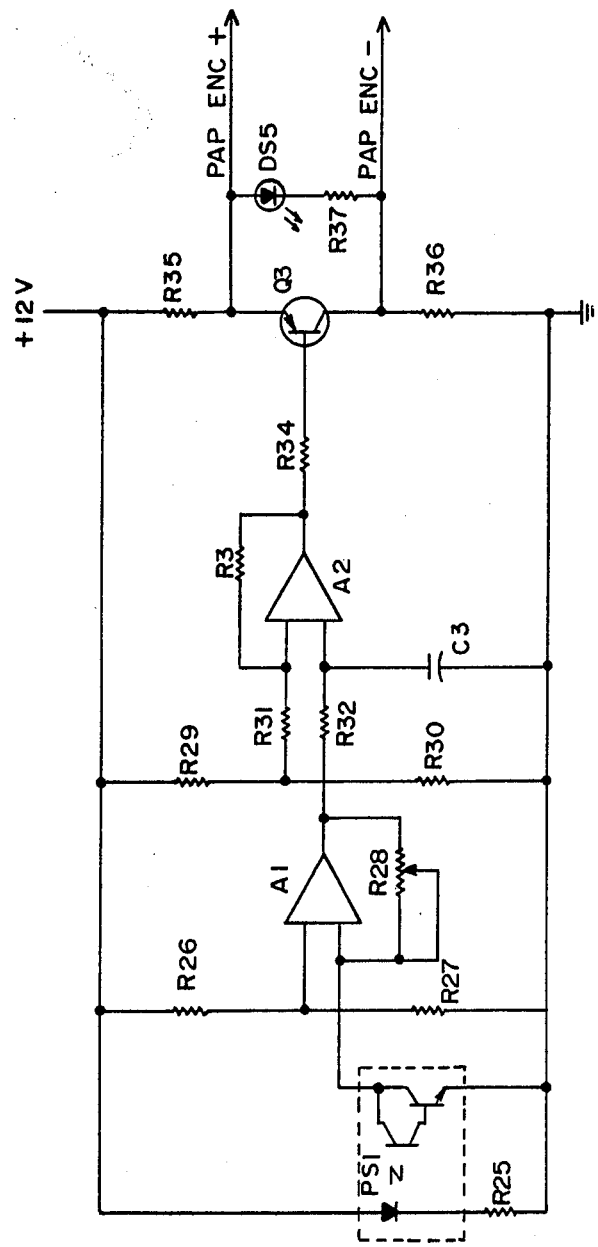
FIG. 19 is a schematic diagram of the aperture pulse circuit associated with the paper feed system.

FIG. 19 shows the aperture pulse circuit which produces pulses as the apertured disk 214 (of FIGS. 11a–11c) attached to supply metering roller 184 turns. By counting the pulses generated, it is possible to determine how far the print paper has been advanced.

The aperture pulse circuit of FIG. 19 includes a LED-photoDarlington pair PS1 which, together with resistor R25, produces a pulsing photosignal as the apertured disk 214 turns. The LED of PS1 is mounted on one side of the disk and the photoDarlington is mounted on the other side, so that light from the LED reaches the photoDarlington each time an aperture in the disk passes.

The output of PS1 is processed by an amplifier circuit formed by R26, R27 and R28 and A1, and a comparator circuit formed by R29–R34, C3 and A2.

The output of the comparator circuit controls a differential line driver formed by resistors R35 and R36 and transistor Q3. The PAP ENC + and PAP ENC − output lines which are supplied to the paper feed are derived from the emitter and collector, respectively, of Q3. When Q3 is turned on, the voltage between the two lines is approximately OV; when Q3 is turned off, the voltage is approximately 5V.

An indicator circuit formed by light emitting diode DS5 and resistor R37 is connected between the PAP ENC + and PAP END − lines. DS1 flashes on and off as the paper supply metering roller and the apertured disk move. DS1 indicates that paper travel information (i.e. pulses) is being transmitted to the paper feed control circuit.

Figure 20A:
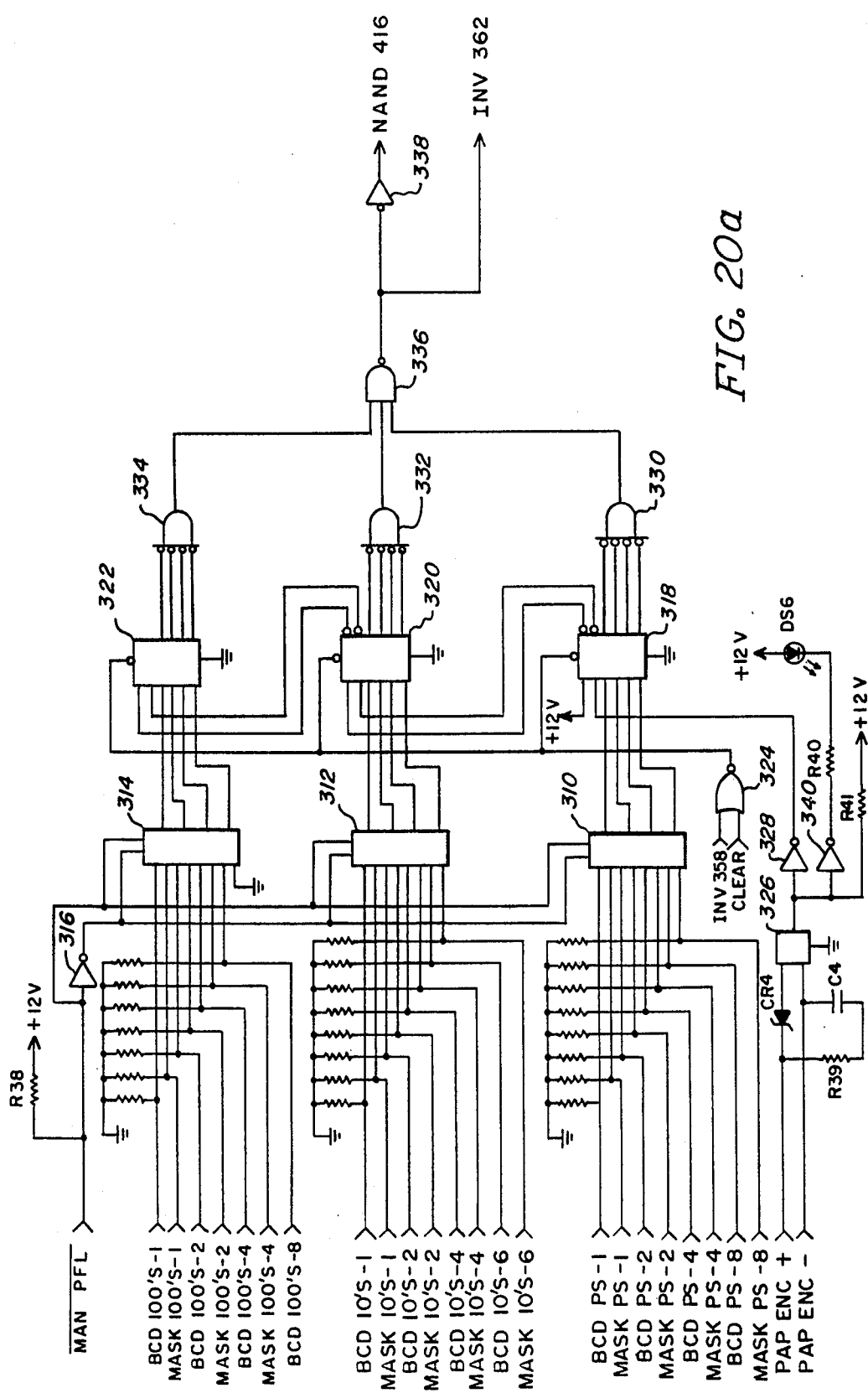
FIGS. 20a and 20b schematically show the paper feed circuitry.
Figure 20B:
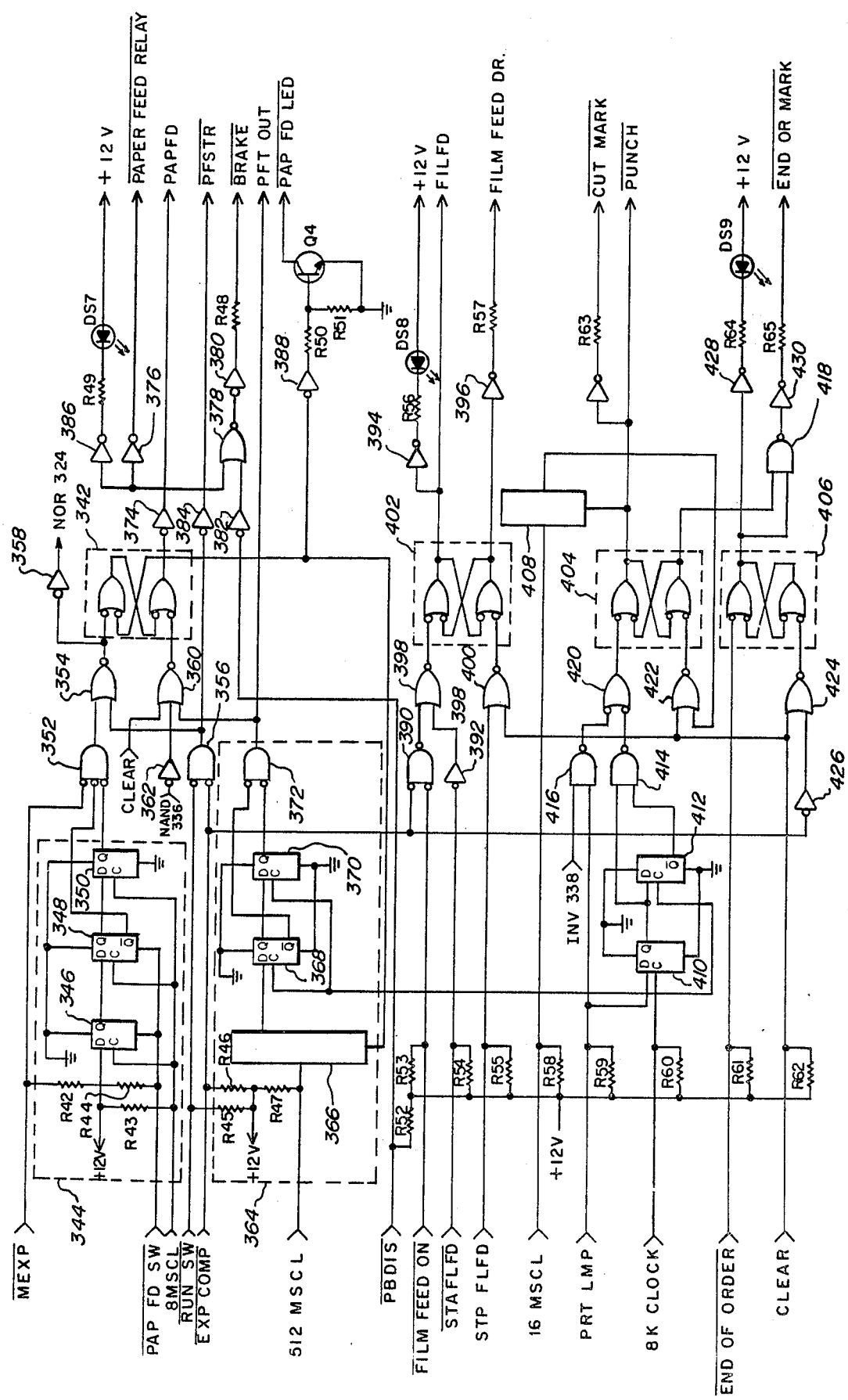

FIGS. 20a and 20b are schematic diagrams of the paper feed circuitry. This circuitry controls the operation of the paper feed mechanism in both the automatic and manual paper feed modes of operation.

The paper feed circuitry of FIG. 20a receives the desired feed length in binary coded decimal form from both the paper mask Microswitches, which sense the feed length encoded on the paper mask, and the paper feed count switches 82 (shown in FIG. 4). The "1's", "10's" and "100's" inputs are applied to quad AND-OR select circuits 310, 312 and 314 respectively. The inputs from the paper feed count switches are applied to the "A" inputs and the inputs from the paper mask Microswitches are applied to the "B" inputs.

The outputs of the quad AND-OR select circuits 310, 312 and 314 are equal to either their "A" or their "B" inputs, depending on the state of the $\overline{\text{MAN PFL}}$ signal. This signal is produced by the PAPER AUTO/MAN switch 84 on the control panel (FIG. 4). When the PAPER AUTO/MAN switch is in the MAN position, the $\overline{\text{MAN PFL}}$ signal, which is applied to the $K_A$ and $K_B$ inputs of select circuits 310, 312 and 314 by means of resistor R38 and inverter 316, causes the "A" inputs to be outputted. Conversely, when the PAPER AUTO/MAN switch is in the AUTO position, the $\overline{\text{MAN PFL}}$ signal causes the "B" inputs to be outputted by select circuits 310, 312 and 314.

The outputs of select circuits 310, 312 and 314 are applied to the inputs of "1's", "10's" and "100's" counters 318, 320 and 322, respectively. Counters 318, 320 and 322 are countdown counters, which count down to zero from the number applied to their inputs.

The load signal which causes the inputs from select circuits 310, 312 and 314 to be loaded into counters 318, 320 and 322 is derived from NOR gate 324. The inputs of NOR gate 324 cause a load signal to be produced by NOR gate 324 whenever an exposure is completed or the CLEAR switch has been energized.

The counting of counters 310, 312 and 314 is controlled by the PAP ENC + and PAP ENC − signals from the aperture sensing circuit. Each pulse on these two inputs indicates that the paper supply metering roller has advanced by a predetermined increment. This pulse is received by the interface circuitry including resistor R39, capacitor C4, zener diode CR4, optoisolator 326 and inverter 328 and is applied to the countdown input of "1's" counter 318.

With each pulse produced by the aperture sensing circuit, the count stored in counters 318, 320 and 322 is decremented by one. The outputs of counters 318, 320 and 322 are NANDed by NAND gates 330, 332 and 334. The outputs of gates 330, 332 and 334 are NANDed by NAND gate 336. When the outputs of counters 318, 320 and 322 all reach zero, therefore, the output of NAND gate 336 goes to "0". This indicates that the desired paper feed length has been attained and paper feed should be halted.

Both the uninverted and the inverted outputs of NAND gate 336 are used by the remainder of the paper feed circuitry. The inverted output is produced by inverter 338.

The paper feed circuitry includes an indicator circuit formed by inverter 340, resistors R40 and R41 and light emitting diode DS6. As the paper supply metering roller moves, DS6 flashes on and off. When the roller stops, this light may remain on or go out, depending on the position of the paper supply metering roller. When DS6 is flashing, it indicates that information is being supplied to the paper feed circuitry from the aperture sensing circuitry to determine the length of paper feed.

Indicator DS6 works in conjunction with indicator DS5 in the aperture sensing circuit. When DS6 is on, DS5 is off, and when DS5 is on, DS6 is off.

FIG. 20b shows the remainder of the paper feed circuitry. The paper feed operation is generally controlled by paper feed flip-flop 342. When paper feed flip-flop 342 is "set", paper is fed; when it is reset, paper feed is halted.

Paper feed flip-flop 342 may be set either manually or automatically. The manual commencement of paper feed is achieved by depressing PAPER switch 58 on the operator panel. This generates the $\overline{\text{PAP FD SW}}$ signal which, along with the $\overline{\text{MEXP}}$ and 8MSCL signals from the cycle control circuit, cause a set signal to be applied to paper feed flip-flop 342.

The $\overline{\text{PAP FD SW}}$ and 8MSCL (clock) signals are applied to paper feed filter 344, which is both a time delay filter and a pulse generator. Contact bounce and other noice on the $\overline{\text{PAP FD SW}}$ line is filtered and a pulse is produced by paper feed filter 344, which includes resistors R42-R44 and flip-flops 346, 348 and 350.

The two outputs of paper feed filter 344 are NANDed with the $\overline{\text{MEXP}}$ signal by NAND gate 352 and applied to the set input of paper feed flip-flop 342 through NOR gate 354. THE $\overline{\text{MEXP}}$ signal prevents a manual paper feed from beginning as a result of the PAPER switch 58 being depressed if an exposure is still taking place. This is an important inhibit feature, since the commencement of paper feed during exposure would ruin the print.

The automatic commencement of paper feed is achieved by the $\overline{\text{RUN SW}}$ and $\overline{\text{EXP COMP}}$ signals, NAND gate 356 and NOR gate 354. When the RUN/TEST switch 64 is in the RUN position and the cycle control circuit generates the $\overline{\text{EXP COMP}}$ signal, which indicates that the exposure is complete, NAND gate 356 and NOR gate 354 provide a set signal to paper feed flip-flop 342, thereby automatically commencing the paper feed.

The set input to paper feed flip-flop 342 is also supplied, through inverter 358, to NOR gate 324 shown in FIG. 20a. When paper feed flip-flop 342 is set, a load signal is also provided by NOR gate 324 to counters 318, 320 and 322. This load signal causes the desired paper feed count to be loaded into counters 318, 320 and 322 at the commencement of paper feed.

Paper feed is halted by a Reset signal from NOR gate 360 to the Reset input of paper feed flip-flop 342. NOR gate 360 has three inputs, thereby providing three different means of halting paper feed.

The first input to NOR gate 360 is the CLEAR signal. As previously discussed, the CLEAR signal halts all operations and clears all of the circuits so that a new print cycle can be commenced from the beginning.

The second input is the output of NAND gate 336 of FIG. 20a, which is inverted by inverter 362. When the desired paper feed count has been attained the output of NAND gate 336 goes to "0" and and the second input to NOR gate 360 goes to "1", thereby resetting paper feed flip-flop 342. Under normal operation, it is the second input which causes paper feed flip-flop 342 to be reset.

The third input resets paper feed flip-flop 342 and thereby terminates the paper feed after a predetermined time period. This is a safety feature which prevents the entire paper roll from being fed in the event that the signal to the second input of NOR gate 360 is not produced during the predetermined time period. The failure to produce the signal to the second input can be caused by a variety of possible mechanical and electrical failures or malfunctions. The third input to NOR gate 360 prevents such a failure or malfunction from causing excessive paper feed.

The third input is produced by paper feed time out counter 364, which is formed by resistors R45, R46 and R47, binary counter 366, flip-flops 368 and 370 and NAND gate 370. In one preferred embodiment about 7 seconds is the time period before paper feed time out counter 364 generates the third input signal which resets paper feed flip-flop 342. When paper feed flip-flop 342 is set, counter 366 is reset and counter 366 begins to count up at a rate determined by the 512 MSCL clock signal. When counter 366 reaches a predetermined count, it produces an output to the pulse generator formed by flip-flops 368 and 370 and NAND gate 372. The output of the pulse generator is applied to the third input of NOR gate 360, and is also provided to the cycle control circuit at the PFT OUT signal.

The output of paper feed flip-flop 342 is inverted by inverter 374 to produce the PAP FD signal to the cycle control circuit. The output of inverter 374 is inverted by inverter 376 to produce the $\overline{\text{PAPER FEED RELAY}}$ signal, which controls operation of the paper feed motor.

The feed control circuit also produces a $\overline{\text{BRAKE}}$ signal which controls operation of the paper brake. The $\overline{\text{BRAKE}}$ signal is generated by NOR gate 378, inverter 380, and resistor R48. One input to NOR gate 378 is derived from the output of inverter 374 and the other input is the $\overline{\text{PBDIS}}$ signal which is inverted by inverter 382. The brake is released by the $\overline{\text{BRAKE}}$ signal when paper feed flip-flop 342 is set. It is also released in response to the $\overline{\text{PBDIS}}$ signal, which is produced by the supply roller disengage switch. The $\overline{\text{PBDIS}}$ signal is generated only during initial threading of the print paper, and causes the brake, but not the paper drive motor, to be released to facilitate paper threading.

Another signal provided to the cycle control circuit by the feed control circuit is the $\overline{\text{PFSTR}}$ signal. Inverter 384 inverts the output of NAND gate 356 to produce the $\overline{\text{PFSTR}}$ signal.

An indicator circuit formed by inverter 386, resistor R49 and light emitting diode DS7 is driven by the inverted output of paper feed flip-flop 342. DS7 is lit when power is being applied to the paper feed mechanism to cause a paper feed.

The paper feed indicator 74 on the control panel is also lit during a paper feed. An indicator drive circuit formed by inverter 388, resistors R50 and R51, and transistor Q1 produces the $\overline{\text{PAP FD LED}}$ signal which drives paper feed indicator 74.

FIG. 20b also shows optional film feed and paper punch control circuits. The film feed circuit automatically advances the negative film from one negative to the next. The paper punch circuit drives a paper punch which provides indexing punched indicia on the print paper to allow subsequent automatic cutting of the print paper into individual prints.

The film feed control circuit includes resistors R52-R57, NAND gate 390, inverters 392, 394 and 396, NOR gates 398 and 400, and film feed flip-flop 402. The film feed control circuit receives the FILM FEED ON, STA FLFD, STP FLFD, and EXP COMP signals and produces the FILFD and FILM FEED DR signals.

The FILFD and FILM FEED DR signals are derived from the outputs of film feed flip-flop 402. When the automatic film feed is in operation, as indicated by the $\overline{\text{FILM FEED ON}}$ signal being "0", and the EXP COMP is "0" (indicating the exposure is complete), film feed flip-flop 402 is set by means of NAND gate 390 and NOR gate 398.

Film feed flip-flop 402 may also be set by the $\overline{\text{STAFLFD}}$ signal, which applies a set signal by means of inverter 392 and NOR gate 398. The $\overline{\text{STAFLFD}}$ signal is produced manually be means of a film feed start switch (not shown).

Film feed flip-flop 402 is reset, thereby halting film feed, by a reset signal from NOR gate 400. The inputs to NOR gate 400 which may produce the reset signal are the STPFLFD and the CLEAR signals.

The FILFD signal is directed to the cycle control circuit which coordinates the operation of the automatic film feed with the remainder of the printer system. The FILM FEED DR signal controls the operation of the film feed drive mechanism.

The indicator circuit formed by inverter 394, resistor R56 and light emitting diode DS8 is driven by an output of film feed flip-flop 402. DS8 is lit when the negative film is being fed.

The optical punch drive circuit produces $\overline{\text{CUT MARK}}$ $\overline{\text{END OR MARK}}$ and $\overline{\text{PUNCH}}$ signals. The $\overline{\text{CUT MARK}}$ signal is applied to a solenoid drive which causes a "cut" punch mark indicating the position of each print. The $\overline{\text{END OR MARK}}$ is applied to a solenoid which causes an "end of order" mark to be made on the print paper to indicate the end of an order. The "cut" and "end of order" marks are used if the print paper is to be cut by an automatic print cutter.

The $\overline{\text{PUNCH}}$ signal is provided to the cycle control circuit, which delays the commencement of a new exposure until the punch operation is completed. If this delay were not provided, an exposure might begin while the punch is operating. Since the punch causes some vibration of the paper deck, commencement of exposure during punching could have adverse effects upon the quality of prints.

The punch control circuit includes punch duration flip-flop 404, end of order flip-flop 406, punch duration counter 408, resistors R58-R65, flip-flops 410 and 412, NAND gates 414–416 and 418, NOR gates 420, 422, and 424, inverters 426, 428 and 430, and light emitting diode DS9.

The $\overline{\text{PUNCH}}$ and $\overline{\text{CUT MARK}}$ signals are derived from the output of punch duration flip-flop 404. The solenoid drive for the paper punch is energized when punch duration flip-flop 404 is set.

Punch duration flip-flop 404 is set by an "0" at the output of NOR gate 420. One input of NOR gate 420 is derived from the output of NAND gate 416, which NANDs the PRT LAMP signal with the output of inverter 338 of FIG. 20a. The other input to NOR gate 420 is produced by the pulse generator formed by flip-flops 410 and 412 and NAND gate 414.

Punch duration flip-flop 404 is reset by the CLEAR signal or by the output of punch duration counter 408. These two signals are NORed by NOR gate 422 and applied to the Reset input of punch duration flip-flop 404.

Under normal operation, the signal from punch duration counter 408 resets punch duration flip-flop 404. Counter 408 is reset when punch duration flip-flop 404 is set, and begins to count up at a rate determined by the 16 MSCL clock signal. When counter 408 reaches a predetermined count, it generates a signal which causes punch duration flip-flop 404 to be reset.

End of order flip-flop 406 is set by the $\overline{\text{END OF ORDER}}$ signal. It is reset by the output of NOR gate 424, which has as its inputs the CLEAR signal and the $\overline{\text{EXP COMP}}$ signal which is inverted by inverter 426.

NAND gate 418 NANDs outputs from punch duration flip-flop 404 and end of order flip-flop 406. The $\overline{\text{END OR MRK}}$ signal is produced when punch duration flip-flop 404 is reset and end of order flip-flop 406 is set.

An indicator circuit formed by inverter 428, resistor R64 and light emitting diode DS9 is driven by the output of end of order flip-flop 406. DS9 lights when the end of an order occurs.

(5) Cycle Control

Figure 21A:
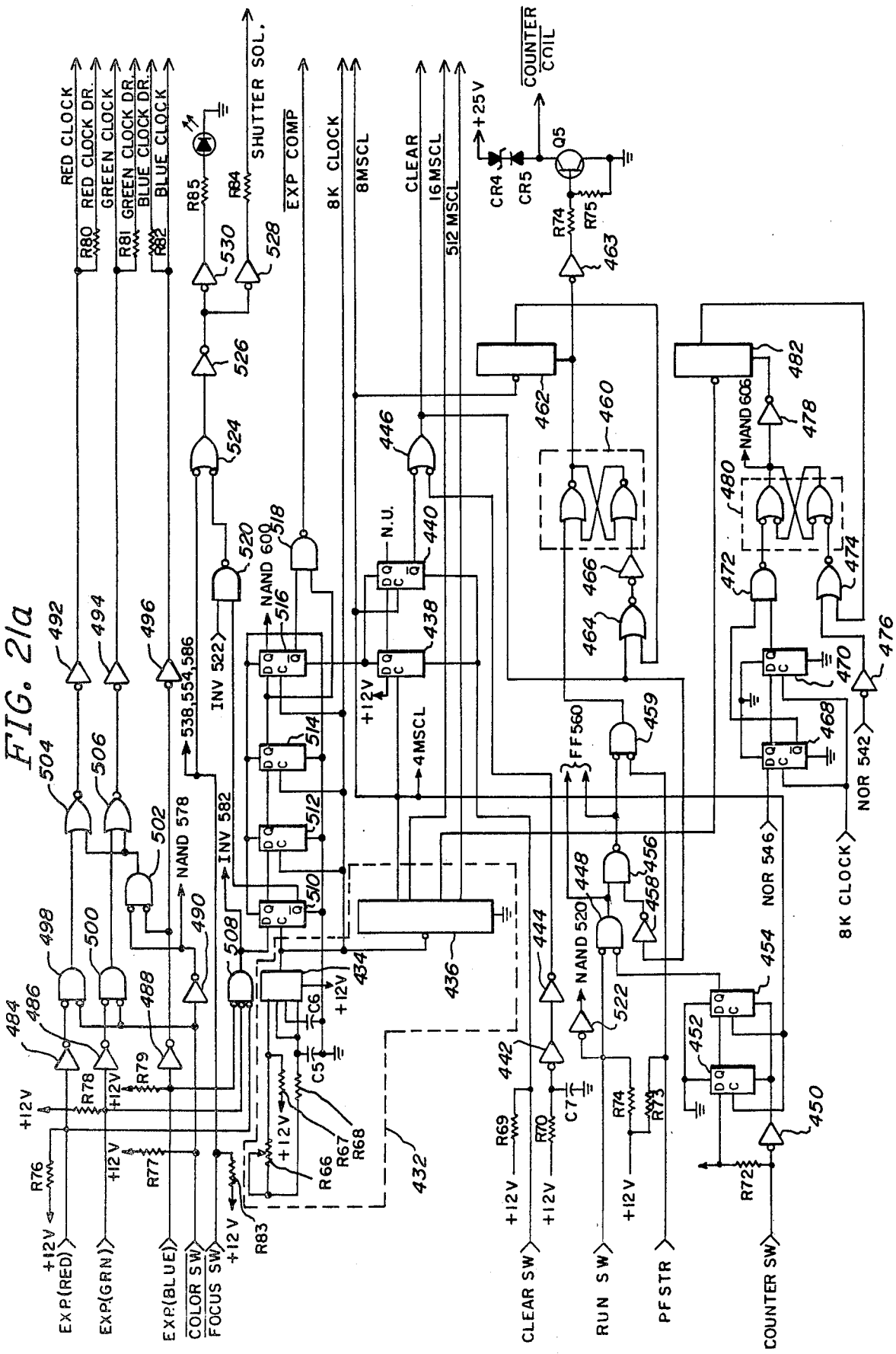
FIGS. 21a and 21b schematically show the cycle control circuitry of the printer.
Figure 21B:
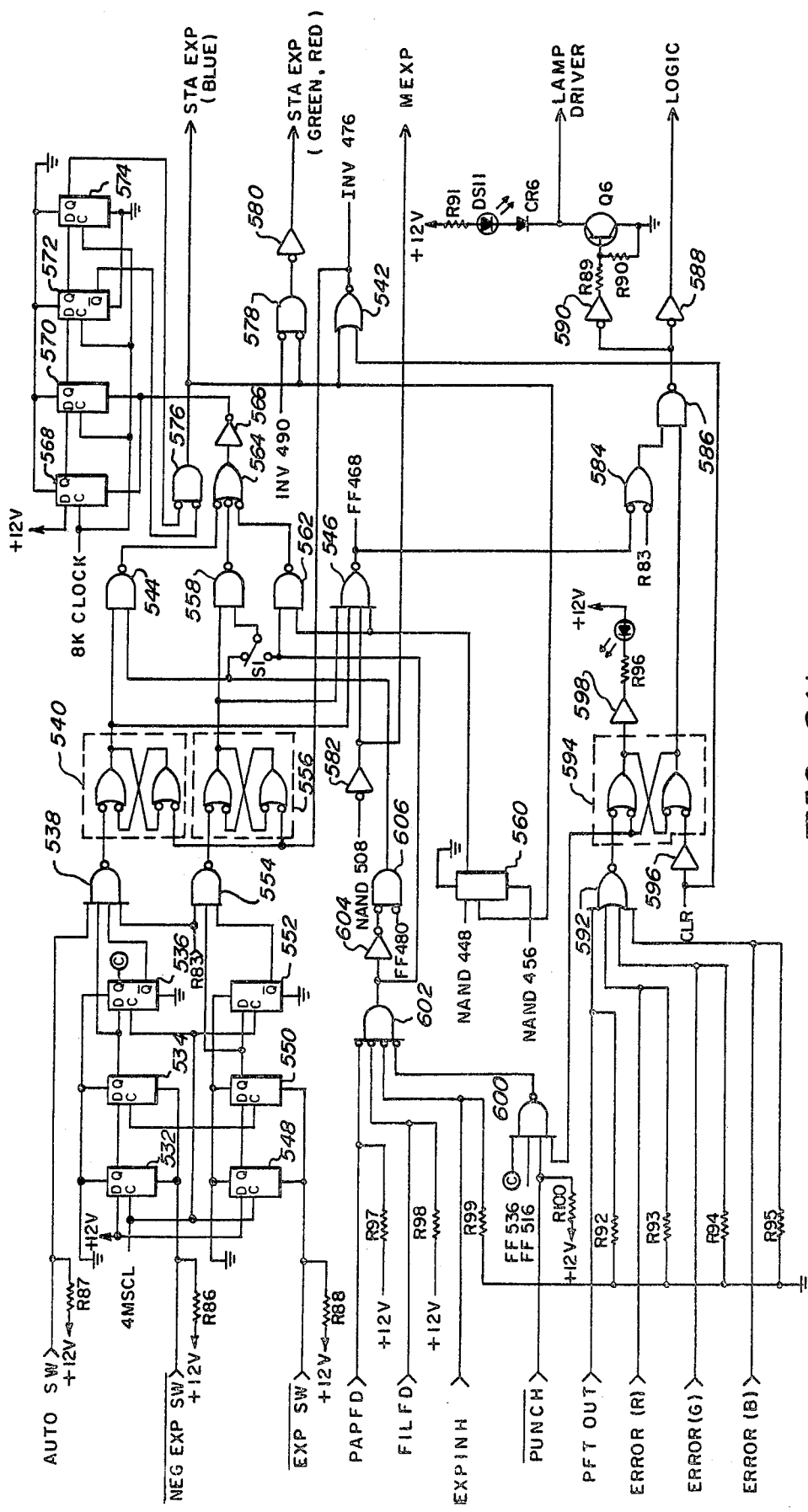

FIGS. 21a and 21b are schematic diagrams of the cycle control circuit. The cycle control coordinates the operation of the various circuits which have been discussed previously. It contains, therefore, several different circuits which provide signals to the other circuits, such as the exposure control and paper feed circuits.

One of the circuits of the cycle control is the clock oscillator circuit 432 formed by resistors R66, R67 and R68, capacitors C5 and C6, 8kHz oscillator 434 and clock divider counter 436. The clock oscillator circuit 432 produces the 8K CLOCK, 4MSCL, 8 MSCL, 16 MSCL and 512 MSCL clock signals.

A second circuit in the cycle control is the clear circuit, which receives the $\overline{\text{CLEAR SW}}$ signal from the operator panel and generates the CLEAR signal which clears the logic of the various control circuits and allows a new cycle to be commenced. The clear circuit includes resistor R69, a clear switch input filter formed by flip-flops 438 and 440, a power-on clear circuit formed by R70, C7 and inverters 442 and 444 and NOR gate 446.

The $\overline{\text{CLEAR SW}}$ signal is filtered by flip-flops 438 and 440 to prevent contact bounce and other noise which may produce erroneous signals. The output of flip-flop 440 is applied to one of the inputs of NOR gate 446, whose output is the CLEAR signal. When the clear switch is depressed on the operator panel, the output of flip-flop 440 goes to "0" and the CLEAR signal is generated.

The CLEAR signal is also automatically produced when power is turned on. This ensures that all of the control circuits are ready when a cycle is commenced. The power-on clear circuit formed by R70, C7 and inverters 442 and 444 provides the second input to NOR gate 446. When power is turned on, this second input goes to "0", and a CLEAR signal is produced.

A third circuit in the cycle control is the print-counter drive circuit. This circuit receives the $\overline{\text{RUN-SW}}$ signal from the operator panel, the $\overline{\text{PFSTR}}$ signal from the paper feed control, and the COUNTER SW signal from the control panel and provides the $\overline{\text{COUNTER COIL}}$ signal to the control panel. The $\overline{\text{COUNTER COIL}}$ signal decrements the multiple print counter on the control panel.

The $\overline{\text{RUN SW}}$ signal is received by R71 and applied to input of NAND gate 448. The other input to NAND gate 448 is the COUNTER SW signal, which has been filtered by a filter formed by R72, inverter 450 and flip-flops 452 and 454.

The output of NAND gate 448 is NANDed by NAND gate 456 with the CLEAR signal, which has been inverted by inverter 458. The inverted CLEAR signal is normally "1" and, therefore, the states of the $\overline{\text{RUN SW}}$ and COUNTER SW signals normally control the output of NAND gate 456. In the absence of a CLEAR, the output of NAND gate 456 is "0" when $\overline{\text{RUN SW}}$ is "0" (indicating that the RUN switch is in the RUN position) and COUNTER SW is "0" (indicating that a nonzero number of prints are indicated on the multiple print counter).

The output of NAND gate 456 is NANDed with the $\overline{\text{PFSTR}}$ signal by NAND gate 459. The $\overline{\text{PFSTR}}$ Signal levels are determined by input resistor R73, which is tied to a +12 v supply.

When the output of NAND gate 459 is "1", it sets counter coil timer flip-flop 460. This causes the counter coil driver formed by inverter 463, resistors R74 and R75, zener diode CR4, diode CR5 and transistor Q5 to produce a "0" $\overline{\text{COUNTER COIL}}$ signal. This signal causes the multiple print counter to be decremented.

Counter coil timer flip-flop 460 is reset and decrementing of the multiple print counter is halted by either the CLEAR signal or the output signal from counter coil timer 462. These two signals are applied to the reset input counter coil timer flip-flop 460 by means of NOR gate 464 and inverter 466.

The normal reset of counter coil timer flip-flop 460 is by counter coil timer 462, which is a binary counter 462. When counter coil timer flip-flop 460 is set, counter coil timer 462 is reset to zero. The 8MSCL clock signal drives counter coil timer 462 and when counter coil timer has counted up to a predetermined number, an output "1" is produced which causes counter coil timer flip-flop 460 to be reset. By this arrangement, the multiple print counter is decremented by only one digit for each print cycle.

A fourth circuit in the cycle control is the exposure delay circuit formed by flip-flops 468 and 470, NAND gate 472, NOR gate 474, inverters 476 and 478, exposure delay flip-flop 480, and exposure delay timer 482. The exposure delay circuit provides an approximately ½ second delay before exposure is commenced so that the entire printer system has stabilized when exposure begins.

A fifth circuit receives the EXP (RED), EXP (GREEN) and EXP (BLUE) signals from the respective exposure control circuits and the COLOR SW signal from the operator panel. This circuit, which includes resistors R76–R82, inverters 484, 486, 488,, 490, 492, 494 and 496, NAND gates 498, 500 and 502, NOR gates 504 and 506 produces RED CLOCK, RED CLOCK DR, GREEN CLOCK, GREEN CLOCK DR, BLUE CLOCK and BLUE CLOCK DR signals. These signals control an optional timing clock which displays the time elapsed for each of the three color channels. When the COLOR-B/W switch or the operator panel is in the COLOR position, the displays for the three channels are allowed to display different exposure times. On the other hand, when the COLOR-B/W is in the B/W position, only the blue channel is being used and all three displays are caused by the logic to display the exposure time of the blue channel. This prevents any confusion which might otherwise occur when black and white prints are being made.

A sixth circuit receives the EXP (RED), EXP (GREEN), EXP (BLUE), FOCUS SW and RUN SW signals and produces the SHUTTER SOL and EXP COMP signals. As discussed previously in the description of the exposure control circuits, when the printer is in the COLOR mode, the first two color channels to complete their exposures cause filter paddles to be driven into the light path. The last color channel to complete its exposure causes the shutter paddle rather than the third filter paddle to be driven into the light path.

When the EXP COMP signal is "0", it indicates that all three color channels have completed their exposures. The EXP COMP signal is provided to the exposure control circuits to cause the shutter paddle rather than the last filter paddle to be driven into the light path. The EXP COMP signal is also provided to the paper feed control to inhibit paper feed until exposure is complete.

To produce the EXP COMP signal, the EXP (RED), EXP (GREEN) and EXP (BLUE) signals are NANDed by NAND gate 508. The output of NAND gate 508 is applied to an exposure complete delay circuit formed by flip-flops 510, 512, 514 and 156 and NAND gate 518. The EXP COMP signal is derived from the output of NAND gate 518.

The SHUTTER SOL signal controls the solenoid which moves the shutter paddle. To produce the SHUTTER SOL signal the Q output of flip-flop 510 is NANDed by NAND gate 520 with the RUN SW signal which has been inverted by inverter 522. The output of NAND gate 520 is applied to an input of NOR gate 524. The second input to NOR gate 524 is the FOCUS SW signal. Inverters 526 and 528 and resistor R84 produce the SHUTTER SOL signal from the output of NOR gate 524.

The output of inverter 526 is also used to drive an indicator circuit including inverter 530, resistor R85 and shutter indicator DS10. When the shutter solenoid is energized, indicator DS10 is lit. A malfunction in the shutter can be traced quickly by viewing DS10 and a similar indicator on the shutter solenoid driver printed circuit board. Both indicators should light when the shutter solenoid is energized.

The remaining circuitry of the cycle control produces the signals required to start a print cycle. These signals include the STA EXP (BLUE), STA EXP (GREEN/RED), $\overline{\text{MEXP}}$, PRT LMP RELAY and PRT LAMP signal.

These are three ways that a print cycle may commence: (1) AUTO—automatically when the neghold switch is depressed by an inserted negative mask; (2) MAN—manually when the EXPOSE switch on the operator panel is pressed; and (3) MULTIPLE PRINT—automatically after the first print cycle until the desired number of prints have been made.

In the AUTO mode, the $\overline{\text{NEG EXP SW}}$ signal from the neghold switch is received by resistor R86 and a NEG EXP SW filter and pulse generator formed by flip-flops 532, 534 and 536 and NAND gate 538. The inputs to NAND gate 538 include the Q output of flip-flop 534, the $\overline{Q}$ output of flip-flop 536, the $\overline{\text{FOCUS SW}}$ signal from R83 and the AUTO SW signal from the control panel. When all inputs are "1", NAND gate 538 sets NEG EXP START flip-flop 540. The AUTO SW signal, therefore, inhibits the neghold switch from setting the NEG EXP START flip-flop 540 when the EXPOSURE AUTO/MAN switch 86 on the control panel (see FIG. 4) is in the MAN position.

NEG EXP START flip-flop 540 is reset by an "0" output from NOR gate 542. The inputs to NOR gate 542 are the CLEAR and the STA EXP (BLUE) signals. NOR gate 542 also supplies its output to inverter 476 of the exposure delay timer circuit discussed previously.

The output of NEG EXP START flip-flop 540 is supplied to one input each of NAND gate 544 and NOR gate 546. The output of NAND gate 544 is used in the production of the STA EXP (BLUE) and STA EXP (GREEN/RED) signals, while the output of NOR gate 546 is used in the production of PRT LMP RELAY and PRT LMP signals.

The logic circuitry used in conjunction with the MAN mode is generally similar to that used in conjunction with the AUTO mode. The circuitry includes resistor R88, a MAN EXP SW filter and pulse generator formed by flip-flops 548, 550 and 552 and NAND gate 554, MAN EXP START flip-flop 556 and NAND gate 558.

When the $\overline{\text{EXP SW}}$ signal goes low, it indicates that the EXPOSE switch has been depressed, a negative mask is in place and the EXPOSURE AUTO/MAN switch is in the MAN position. This causes the MAN EXP SW filter and pulse generator to produce a pulse which sets MAN EXP START flip-flop 556. The output of MAN EXP START flip flop 556 is applied to one input each of NAND gate 558 and NOR gate 546. NAND gate 558 performs a function similar to that of NAND gate 544.

Like NEG EXP START flip-flop 540, MAN EXP START flip-flop 556 is reset by a signal from NOR gate 542. In other words, MAN EXP START flip-flop is reset by either a CLEAR or a STA EXP (BLUE) signal.

The MULTIPLE PRINT mode is controlled by multiple print latch 560 and NAND gate 562. The D input of multiple print latch 560 is derived from NAND gate 442 and is "1" when the RUN switch is in the RUN position and the MULTIPLE PRINT COUNTER has a nonzero value. The clock input of latch 560 is the STA EXP (BLUE) signal, the reset input is derived from the output of NAND gate 456. The output of multiple print latch 560 is supplied to one input each of NAND gate 562 and NOR gate 546.

NAND gates 544, 558 and 562 have their outputs NORed by NOR gate 564. The output of NOR gate 564 is inverted by inverter 566 and supplied to an exposure start filter and delay circuit formed by flip-flops 568, 570, 572 and 574 and NAND gate 576. The output of NAND gate 576 is the STA EXP (BLUE) signal.

When color prints are being made, the STA EXP (GREEN/RED) signal is also produced. The STA EXP (BLUE) signal is NANDed by NAND gate 578 with the inverted COLOR SW signal from inverter 490. The output of NAND gate 578 is inverted by inverter 580 to produce the STA EXP (GREEN/RED) signal.

The output signals from NEG EXP START flip-flop 540, MAN EXP START flip-flop 556 and MULTIPLE PRINT latch 560 are also used to produce the PRT LMP RELAY and PRT LMP signals. The three output signals, together with the $\overline{\text{MEXP}}$ signal from inverter 582, are NORed by NOR gate 546. The $\overline{\text{MEXP}}$ signal is "1" when an exposure is in progress. by NORing the $\overline{\text{MEXP}}$ signal with the other three signals, the output of NOR gate 546 is prevented from changing when an exposure is in progress, even though flip-flops 540 and 556 and latch 560 may be reset during the exposure.

The output of NOR gate 546 is NORed with the $\overline{\text{FOCUS SW}}$ signal by NOR gate 584. In turn, the output of NOR gate 584 is applied to one input of NAND gate 586. The other input to NAND gate 586 is an inhibit signal which, under normal operating conditions, is "1". The output of NOR gate 584, therefore, normally determines the output of NAND gate 586.

The PRT LMP signal, which is supplied to the paper feed control, is derived from the output of NAND gate 588. Also connected to the output of NAND gate 588 is a lamp driver circuit formed by inverter 590, resistors R89, R90 and R91, indicator DS11, diode CR6 and transistor Q6. The PRT LMP RELAY signal to the print lamps is derived from the collector of Q6.

Indicator DS11 operates in conjunction with the print lamps. When the print lamps are at high intensity, DS11 is also at high intensity. When the print lamps go to low intensity, DS11 goes to low intensity.

The cycle control includes inhibit circuitry which inhibits the production of STA EXP (BLUE), STA EXP (GREEN/RED), PRT LMP RELAY, and PRT LMP signals unless and until certain conditions exist. The inhibit of the PRT LMP RELAY and PRT LMP signals is achieved by the second input to NAND gate 586. Similarly, the inhibit of the STA EXP (BLUE) and STA EXP (GREEN/RED) signals is achieved by the second inputs to NAND gates 544, 558 and 562.

The first portion of the inhibit circuitry includes input resistors R92–R95, NOR gate 592, ERROR flip-flop 594, inverter 596 and an indicator circuit including inverter 578, resistor R96 and indicator DS12. The four inputs to NOR gate 592 are the PFT OUT, ERROR (R), ERROR (G) and ERROR (B) signals. PFT OUT signal is from the paper feed circuit and is "1" when the paper feed time out counter 364 has stopped paper feed because paper feed has begun and is not completed in a predetermined period of time. The ERROR (R), ERROR (G) and ERROR (B) signals are optional signals which are "1" if some type of error mode exists in the red, green or blue channel.

If any of the inputs to NOR gate 592 are "1", ERROR flip-flop 594 is set. This causes the second input to NAND gate 586 to be "0", which inhibits the production of the PRT LMP and PRT LMP RELAY signals. In addition, DS12 is lit when ERROR flip-flop 594 is set, thereby indicating an error condition exists.

ERROR flip-flop 594 is reset by the CLEAR signal, which is inverted and applied to the reset input of ERROR flip-flop 594 by inverter 596. Once ERROR flip-flop 594 is set, the printer will not function until a CLEAR signal has been produced.

The second portion of the inhibit circuitry includes input resistors R97-R100, NAND gates 600 and 602, inverter 604, NAND gate 606 and delay switch S1. In order for an exposure to be started, ERROR flip-flop 594 must be reset, the $\overline{\text{PUNCH}}$ signal must be "1", and the outputs of flip-flops 516 and 536 must be "1". In that case, the output of NAND gate 600 is "0".

All four inputs of NAND gate 602 (i.e. PAPFD, FILFD, EXPINH and the output of NAND gate 600) must be "0". If any of the four inputs is "1", the exposure cannot be started.

The inhibit to production of the STA EXP (BLUE) and STA EXP (GREEN/RED) signals is delayed in the AUTO mode, may or may not be delayed depending on the position of delay switch S1 in the MAN mode, and is not delayed in the MULTIPLE PRINT mode. The delay is provided by inverter 604, which inverts the output of NAND gate 602 and NAND gate 606, which NANDs the output of inverter 604 with the output of exposure delay flip-flop 480 of the exposure delay timer. This delay is of approximately ½ second duration, which allows the printer systems to stabilize before the exposure is begun.

The delayed inhibit is applied to the second input of NAND gate 544 and to the second input of NAND gate 558 when delay switch S1 is in the delay position. The output of NAND gate 602, which is the undelayed inhibit, is applied to the second input of NAND gate 562 and to the second input NAND gate 558 when delay switch S1 is in the NO delay position.

In conclusion, the cycle control produces signals which coordinate the operations of other electrical subsystems, such as the paper feed control and the exposure controls. In addition, the cycle control produces signals which start and stop exposure and control the print lamps. The operation of the cycle control, and hence the printer electrical systems in general, is inhibited in the event any one of several potential error conditions exist.

TYPICAL OPERATOR PROCEDURES

The following procedures are typical of the procedures used daily by an operator in making photographic prints with the printer of the present invention:

1. The day's work is sorted according to
   a. Color or black and white printing,
   b. Film size, and
   c. Enlargement size.
   This sorting prevents unnecessary set-up and paper changes.
2. The POWER switch 52 and the LAMP switch on the lamphouse are turned to the ON position. The printer is allowed 30 minutes warm-up time with the lamps on.
3. The LAMP switch is turned to the OFF position.
4. The operator determines which lens is required for the negative-to-print size desired. The lens is set to the proper "f" stop and installed in the printer.
5. PRINT/FOCUS switch 60 is set to the PRINT position.
6. The print paper is loaded and the proper size paper mask is installed. This operation must be accomplished in total darkness.
7. The LAMP switch is turned to the ON position.
8. The lens deck is set to the proper position for the particular film and enlargement size.
9. The paper deck is set to the proper position.
10. The clock ON/OFF switch is turned to the ON position.
11. The COLOR-B/W switch 52 is set to the desired position.
12. For black and white printing the color controls are set to "16-16-16". For color printing the proper settings are derived from a set-up chart used by the operator. The set-up chart lists the desired settings which have been derived by experience, for various types of films, print papers and enlargement sizes.
13. The density controls 70 and 72 are set to settings shown on the set-up chart.
14. The dichroic filters are either set completely out of the light path for black and white printing, or are set to the setting shown on the set-up chart for color printing.
15. The SENSOR ON/OFF switch 88 is set to the desired position.
16. The EXPOSE AUTO/MAN switch 66 is set to the desired position.
17. The RUN/TEST switch 64 is set to the TEST position. A negative is inserted into the negative mask; then the negative mask is slid to the printing position (fully to the rear of the neghold base). The printlamp and proper color controls are checked to see if they are functioning. During this test, the RUN/TEST switch disables the shutter and paper feed so that print paper is not wasted. After the test, the negative mask is removed from the printer.
18. The RUN/TEST switch 64 is set to the RUN position.
19. The PAPER AUTO/MAN switch 84 is set to the desired position. When set to MAN, the FEED COUNT switches 82 must be set.
20. The multiple print counter 80 is set to the desired quantity if multiple prints are required.
21. At this point, tests for daily color balancing adjustments are made prior to printing any customer orders.
22. A customer negative is placed into the negative mask (emulsion side down).
23. The negative mask is slid into the printing position. When the EXPOSE AUTO/MAN switch 86 is in the AUTO position, the print cycle begins automatically; when in the MAN position, the EXPOSE switch 54 must be pressed to start the print cycle. After the exposure is complete, the paper advances and another print cycle may be commenced.
24. After the final exposure, the PAPER switch 58 is used to advance the paper at least 20 in. (500mm) to clear the paper mask area.
25. The exposed paper is removed from the printer in the following manner:
    a. The LAMP switch is turned to the OFF position.
    b. The printing room is darkened.
    c. The print paper is cut between the take-up metering roller 188 and the take-up roller 190.
    d. The exposed paper is removed from the printer and processed, while ensuring that the paper is not further exposed by room light.
    e. The remaining paper is rethreaded onto the take-up roller 190.

CONCLUSION

The paper feed cut off of the present invention overcomes a problem which has been encountered in previous photographic printers having automatic paper feed. As a result of the present invention, mechanical or electrical malfunctions will not cause excessive waste of paper as had been the case in the past.

Although the present invention has been described with reference to preferred embodiments, workers skilled in the art will recognize that changes may be made without departing from the spirit and scope of the invention. For example, although the paper feed cut off of the present invention has been described in the context of a specific printer with a specific paper feed system, the paper feed cut off is applicable to other printers as well.

What is claimed is:

1. In a photographic printer having a paper feed system for advancing print paper by a predetermined feed length after each exposure, the improvement comprising:

paper feed cut off means for terminating paper feed after a predetermined period if paper feed has not been previously terminated, wherein the predetermined period exceeds the time normally required for advancing the print paper the predetermined feed length.

2. The invention of claim 1 wherein the paper feed cut off means also produces a signal which inhibits further printing operation of the photographic printer if the paper feed cut off means has terminated the paper feed.

3. The invention of claim 1 wherein the paper feed cut off means comprises:
   counter means for counting in response to clock signals; and
   cut off signal generator means for producing a cut off signal when the counter means reaches a predetermined count.

4. The invention of claim 3 wherein the paper feed system includes paper drive means for advancing the print paper and paper brake means for halting advance of the print paper.

5. The invention of claim 4 and further comprising:
   paper drive circuit means for halting the paper drive means in response to the cut off signal; and
   paper brake circuit means for actuating the paper brake means when the paper drive circuit means halts the paper drive means.

6. The invention of claim 5 and further comprising:
   paper feed length determining means for determining the predetermined feed length; and
   paper feed length monitoring means for monitoring print paper being advanced and producing a signal when the print paper has been advanced the predetermined feed length; and wherein the paper drive circuit means is also responsive to the signal from the paper feed length monitoring means to halt the paper drive means.

7. The invention of claim 6 wherein the paper feed length monitoring means produces, except in the case of an error condition, its signal within the predetermined period.

8. The invention of claim 3 and further comprising:
   exposure cycle inhibit means for inhibiting further exposure cycles upon receiving the cut off signal.

9. The invention of claim 8 and further comprising:
   clear circuit means for providing a clear signal to the exposure cycle inhibit means to allow further exposure cycles.

* * * * *